United States Patent
Nagaraja et al.

(10) Patent No.: US 9,204,349 B2
(45) Date of Patent: Dec. 1, 2015

(54) METHOD AND APPARATUS FOR FACILITATING A HAND-IN OF USER EQUIPMENT TO FEMTO CELLS

(75) Inventors: Sumeeth Nagaraja, San Diego, CA (US); Mehmet Yavuz, San Diego, CA (US); Andrei D. Radulescu, San Diego, CA (US); Damanjit Singh, San Diego, CA (US); Jen M. Chen, San Diego, CA (US); Peter H. Rauber, San Diego, CA (US); Aziz Gholmieh, Del Mar, CA (US); Sanjiv Nanda, Ramona, CA (US); Lijun Zhao, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 39 days.

(21) Appl. No.: 12/703,065

(22) Filed: Feb. 9, 2010

(65) Prior Publication Data
US 2010/0203891 A1 Aug. 12, 2010

Related U.S. Application Data

(60) Provisional application No. 61/151,469, filed on Feb. 10, 2009, provisional application No. 61/173,115, filed on Apr. 27, 2009, provisional application No. 61/161,250, filed on Mar. 18, 2009.

(51) Int. Cl.
*H04W 36/00* (2009.01)
*H04W 36/08* (2009.01)
(Continued)

(52) U.S. Cl.
CPC .......... *H04W 36/08* (2013.01); *H04W 36/0055* (2013.01); *H04W 8/26* (2013.01); *H04W 28/18* (2013.01); *H04W 84/045* (2013.01)

(58) Field of Classification Search
CPC .. H04W 28/18; H04W 36/0055; H04W 36/08
USPC ............. 455/435.1, 435.2, 436, 444; 370/331
See application file for complete search history.

(56) References Cited

U.S. PATENT DOCUMENTS 5,872,774 A 2/1999 Wheatley, III
5,898,929 A 4/1999 Haartsen
(Continued)

FOREIGN PATENT DOCUMENTS

CN 1398079 A 2/2003
CN 1875648 A 12/2006
(Continued)

OTHER PUBLICATIONS

International Search Report & Written Opinion—PCT/US10/023784—International Search Authority—European Patent Office—May 25, 2010.
(Continued)

*Primary Examiner* — Qun Shen
(74) *Attorney, Agent, or Firm* — Fariba Yadegar-Bandari

(57) ABSTRACT

Aspects are disclosed for facilitating a hand-in to a femto cell. An identifier is assigned to a femto cell in which the identifier is based on a scrambling parameter and a timing parameter. A relationship between the identifier and the femto cell is then communicated. In another embodiment, a user equipment report is received, which includes attributes related to a signal broadcast by a femto cell. An identifier associated with the femto cell is ascertained from an attribute included in the report. The femto cell is then identified based on the identifier. In a further embodiment, a timing parameter is received, and a scrambling parameter is set. A signal including the scrambling parameter is then broadcast according to an offset related to the timing parameter. In yet another embodiment, a femto cell is detected during an active call. An identifier associated with the femto cell is then ascertained and reported.

25 Claims, 24 Drawing Sheets

(51) Int. Cl.
  *H04W 8/26* (2009.01)
  *H04W 28/18* (2009.01)
  *H04W 84/04* (2009.01)

(56) References Cited

U.S. PATENT DOCUMENTS

| | | | |
|---|---|---|---|
| 6,151,311 | A | 11/2000 | Wheatley, III |
| 6,307,840 | B1 | 10/2001 | Wheatley, III |
| 6,433,739 | B1 | 8/2002 | Soliman |
| 6,590,881 | B1 | 7/2003 | Wallace et al. |
| 6,970,708 | B1 | 11/2005 | Raith |
| 6,983,031 | B2 | 1/2006 | Wheatley |
| 7,295,531 | B2 | 11/2007 | Wheatley, III |
| 7,391,759 | B2 | 6/2008 | Wallace et al. |
| 7,512,111 | B2 | 3/2009 | Kauhanen |
| 7,929,970 | B1 | 4/2011 | Gunasekara et al. |
| 8,226,340 | B1 | 7/2012 | Mahalingam |
| 8,244,257 | B2 * | 8/2012 | Walldeen et al. ............ 455/444 |
| 8,249,189 | B2 | 8/2012 | Aoki et al. |
| 8,355,713 | B1 | 1/2013 | Oh et al. |
| 2003/0114204 | A1 | 6/2003 | Allen et al. |
| 2003/0123666 | A1 * | 7/2003 | Sambhwani et al. ......... 380/270 |
| 2003/0194992 | A1 | 10/2003 | Kim et al. |
| 2004/0043746 | A1 * | 3/2004 | Hiramatsu .................... 455/334 |
| 2005/0058097 | A1 | 3/2005 | Kang et al. |
| 2005/0094589 | A1 | 5/2005 | Camp, Jr. et al. |
| 2005/0099972 | A1 * | 5/2005 | Motegi et al. ................ 370/328 |
| 2005/0130672 | A1 * | 6/2005 | Dean et al. ................. 455/456.1 |
| 2005/0186933 | A1 | 8/2005 | Trans |
| 2006/0293067 | A1 | 12/2006 | Leung et al. |
| 2007/0053340 | A1 | 3/2007 | Guilford |
| 2007/0093268 | A1 * | 4/2007 | Hosono et al. ................ 455/561 |
| 2007/0230393 | A1 | 10/2007 | Sinha et al. |
| 2007/0254620 | A1 | 11/2007 | Lindqvist et al. |
| 2007/0286136 | A1 | 12/2007 | Rittle et al. |
| 2008/0002660 | A1 | 1/2008 | Jeong et al. |
| 2008/0176568 | A1 | 7/2008 | Palanki et al. |
| 2008/0181195 | A1 * | 7/2008 | Cho et al. ...................... 370/350 |
| 2008/0188266 | A1 | 8/2008 | Carter et al. |
| 2008/0254812 | A1 | 10/2008 | Kitazoe |
| 2008/0261596 | A1 | 10/2008 | Khetawat et al. |
| 2008/0268856 | A1 * | 10/2008 | Francalanci et al. .......... 455/446 |
| 2008/0285529 | A1 * | 11/2008 | Kwak et al. ................... 370/338 |
| 2008/0285539 | A1 | 11/2008 | Tiedemann, Jr. et al. |
| 2008/0311926 | A1 * | 12/2008 | Fischer et al. .............. 455/452.1 |
| 2009/0067417 | A1 * | 3/2009 | Kalavade et al. ............. 370/356 |
| 2009/0086691 | A1 | 4/2009 | Balasubramanian |
| 2009/0092122 | A1 | 4/2009 | Czaja et al. |
| 2009/0097452 | A1 | 4/2009 | Gogic |
| 2009/0131049 | A1 | 5/2009 | Osborn |
| 2009/0163216 | A1 | 6/2009 | Hoang et al. |
| 2009/0164547 | A1 | 6/2009 | Ch'ng et al. |
| 2009/0185632 | A1 * | 7/2009 | Cai et al. ....................... 375/260 |
| 2009/0196266 | A1 | 8/2009 | Wu et al. |
| 2009/0210888 | A1 | 8/2009 | Lee et al. |
| 2009/0219888 | A1 * | 9/2009 | Chen et al. .................... 370/331 |
| 2009/0221303 | A1 | 9/2009 | Soliman |
| 2009/0247084 | A1 | 10/2009 | Palanki |
| 2009/0253421 | A1 | 10/2009 | Camp, Jr. et al. |
| 2009/0258672 | A1 | 10/2009 | Camp, Jr. et al. |
| 2009/0290555 | A1 | 11/2009 | Alpert et al. |
| 2009/0316591 | A1 | 12/2009 | Reial et al. |
| 2009/0316654 | A1 | 12/2009 | Prakash et al. |
| 2010/0027694 | A1 | 2/2010 | Touboul et al. |
| 2010/0035601 | A1 | 2/2010 | Chen et al. |
| 2010/0035629 | A1 | 2/2010 | Soliman |
| 2010/0041364 | A1 * | 2/2010 | Lott et al. ................... 455/404.1 |
| 2010/0046494 | A1 | 2/2010 | Palanki et al. |
| 2010/0054237 | A1 | 3/2010 | Han et al. |
| 2010/0061356 | A1 | 3/2010 | Qvarfordt et al. |
| 2010/0067433 | A1 | 3/2010 | Cheng et al. |
| 2010/0067507 | A1 | 3/2010 | Park |
| 2010/0085913 | A1 | 4/2010 | Subrahmanya |
| 2010/0105377 | A1 | 4/2010 | Iwamura et al. |
| 2010/0111070 | A1 | 5/2010 | Hsu |
| 2010/0135248 | A1 | 6/2010 | Aramaki et al. |
| 2010/0136997 | A1 | 6/2010 | Palanki et al. |
| 2010/0150109 | A1 | 6/2010 | Bradley et al. |
| 2010/0157906 | A1 | 6/2010 | Yang et al. |
| 2010/0173630 | A1 | 7/2010 | Han et al. |
| 2010/0197309 | A1 | 8/2010 | Fang et al. |
| 2010/0210239 | A1 | 8/2010 | Karaoguz et al. |
| 2010/0222068 | A1 | 9/2010 | Gaal et al. |
| 2010/0242103 | A1 * | 9/2010 | Richardson et al. ............... 726/7 |
| 2010/0260168 | A1 | 10/2010 | Gheorghiu et al. |
| 2011/0002284 | A1 | 1/2011 | Talwar et al. |
| 2011/0019604 | A1 | 1/2011 | Chun et al. |
| 2011/0058503 | A1 | 3/2011 | Ono |
| 2011/0059739 | A1 | 3/2011 | Huang |
| 2011/0098042 | A1 | 4/2011 | Mach et al. |
| 2011/0128916 | A1 * | 6/2011 | Kwon et al. ................... 370/328 |
| 2011/0158164 | A1 | 6/2011 | Palanki et al. |
| 2011/0182252 | A1 | 7/2011 | Liu et al. |
| 2011/0275402 | A1 | 11/2011 | Charipadi et al. |
| 2011/0281571 | A1 | 11/2011 | Patel et al. |
| 2011/0281574 | A1 | 11/2011 | Patel et al. |
| 2011/0300870 | A1 | 12/2011 | Chun et al. |
| 2011/0312317 | A1 | 12/2011 | Sahin et al. |
| 2012/0040659 | A1 | 2/2012 | Iwamura et al. |
| 2012/0044908 | A1 | 2/2012 | Spinelli et al. |
| 2012/0046025 | A1 | 2/2012 | Das et al. |
| 2012/0046026 | A1 | 2/2012 | Chande et al. |
| 2012/0046063 | A1 | 2/2012 | Chande et al. |
| 2012/0052793 | A1 | 3/2012 | Brisebois et al. |
| 2012/0052855 | A1 | 3/2012 | Soliman et al. |
| 2012/0069800 | A1 | 3/2012 | Soliman et al. |
| 2012/0094663 | A1 | 4/2012 | Awoniyi et al. |
| 2012/0115496 | A1 | 5/2012 | Soliman et al. |
| 2012/0142392 | A1 | 6/2012 | Patel et al. |
| 2012/0178482 | A1 | 7/2012 | Seo et al. |
| 2012/0184206 | A1 | 7/2012 | Kim et al. |
| 2013/0005326 | A1 | 1/2013 | Flanagan |
| 2013/0059592 | A1 | 3/2013 | Chakraborty et al. |
| 2013/0095789 | A1 | 4/2013 | Keevill et al. |
| 2013/0294425 | A1 | 11/2013 | Song et al. |
| 2014/0134997 | A1 | 5/2014 | Song et al. |

FOREIGN PATENT DOCUMENTS

| | | |
|---|---|---|
| CN | 101155167 A | 4/2008 |
| CN | 101330322 | 12/2008 |
| EP | 1098499 A2 | 4/2001 |
| EP | 1809056 A2 | 7/2007 |
| EP | 1871035 A1 | 12/2007 |
| EP | 1983786 A1 | 10/2008 |
| GB | 2446192 | 8/2008 |
| JP | 6334593 A | 12/1994 |
| JP | 2002505542 A | 2/2002 |
| JP | 2004112225 A | 4/2004 |
| JP | 2005184824 A | 7/2005 |
| JP | 2007534221 A | 11/2007 |
| JP | 2007536788 A | 12/2007 |
| JP | 2008172380 A | 7/2008 |
| JP | 4352281 B1 | 10/2009 |
| JP | 2009232434 A | 10/2009 |
| JP | 2009239568 A | 10/2009 |
| JP | 2010041537 A | 2/2010 |
| JP | 2010512054 A | 4/2010 |
| JP | 2010166163 A | 7/2010 |
| KR | 20100034579 A | 4/2010 |
| TW | 200926649 | 6/2009 |
| WO | 9809390 A1 | 3/1998 |
| WO | WO-9937037 | 7/1999 |
| WO | 9944306 A1 | 9/1999 |
| WO | 2005048628 A1 | 5/2005 |
| WO | 2005109767 A1 | 11/2005 |
| WO | 2008066957 A2 | 6/2008 |
| WO | 2008094334 A1 | 8/2008 |
| WO | 2008139707 A1 | 11/2008 |
| WO | WO-2008140225 A1 | 11/2008 |
| WO | WO2009006041 A1 | 1/2009 |
| WO | 2009049207 A2 | 4/2009 |
| WO | 2010017226 A2 | 2/2010 |
| WO | WO-2010022371 | 2/2010 |

(56) References Cited

FOREIGN PATENT DOCUMENTS

| WO | 2010033413 | 3/2010 |
|---|---|---|
| WO | 2010033438 | 3/2010 |
| WO | WO2010059750 | 5/2010 |
| WO | WO2011011760 A2 | 1/2011 |
| WO | WO2011063044 A1 | 5/2011 |
| WO | WO2011109466 | 9/2011 |

OTHER PUBLICATIONS

"3rd Generation Partnership Project; Technical Specification Group Radio Access Network; Evolved Universal Terrestrial Radio Access (E-UTRA); TDD Home eNode B (HeNB) Radio Frequency (RF) requirements analysis (Release 9)", 3GPP Standard; 3GPP TR 36.922, 3rd Generation Partnership Project (3GPP), Mobile Competence Centre ; 650, Route Des Lucioles ; F-06921 Sophia-Antipolis Cedex ; France, No. V9.1.0, Jun. 21, 2010, pp. 1-74.

3rd Generation Partnership Project; Technical Specification Group Radio Access Networks, Home Node B Radio Frequency (RF) requirements (FDD) (Release 9), 3GPP Standard, 3GPP TR 25.967, 3rd Generation Partnership Project (3GPP), Mobile Competence Centre, 650, Route Des Lucioles, F-06921 Sophia-Antipolis Cedex, France, No. 9.0.0, May 1, 2009. pp. 1-55, XP050369580, paragraph [0007].

LG Electronics: "Methods to facilitate the inter-cell coordination in heterogeneous networks", 3GPP Draft; R1-105358 Coordination_Method, 3rd Generation Partnership Project (3GPP), Mobile Competence Centre ; 650, Route Des Lucioles ; F-06921 Sophia-Antipolis Cedex ; France, vol. RAN WG1, no. Xi'an; Oct. 11, 2010, Oct. 5, 2010. XP050450509, [retrieved on Oct. 5, 2010].

MediaTek Inc: "Further Discussion on HeNB Downlink Power Setting in HetNet", 3GPP Draft; R1-105238 Power Setting in HETNET, 3rd Generation Partnership Project (3GPP), Mobile Competence Centre ; 650, Route Des Lucioles ; F-06921 Sophia-Antipolis Cedex ; France, vol. RAN WG1, no. Xi'an; Oct. 11, 2010, Oct. 5, 2010, XP050450424, [retrieved on Oct. 5, 2010].

Mitsubishi Electric: "Dynamic Setup of HNBs for Energy Savings and Interference Reduction", 3GPP Draft; R3-081949 (Dynamic Setup HNBS), 3rd Generation Partnership Project (3GPP), Mobile Competence Centre ; 650, Route Des Lucioles ; F-06921 Sophia-Antipolis Cedex ; France, vol. RAN WG3, no. Jeju Island; Aug. 13, 2008, XP050165010, [retrieved on Aug. 13, 2008].

Qualcomm Europe et al., "TDD HeNB Synchronization Requirement for Large Propagation Distance Case", 3GPP Draft, R4-094985, 3rd Generation Partnership Project (3GPP), Mobile Competence Centre, 650, Route Des Lucioles, F-06921 Sophia-Antipolis Cedex, France, no. Jeju, Nov. 9, 2009, XP050394434, [retrieved on Nov. 17, 2009].

Qualcomm Europe: "HeNB Timing Requirements", 3GPP Draft, R4-091902 Timing Requirements, 3rd Generation Partnership Project (3GPP), Mobile Competence Centre, 650, Route Des Lucioles, F-06921 Sophia-Antipolis Cedex, France, no. San Francisco, Apr. 27, 2009, XP050342629, [retrieved on Apr. 27, 2009] paragraph [0002].

Qualcomm Europe: "Text Proposal on TDD HeNB Synchronization Requirement", 3GPP Draft, R4-093725 Text Proposal for HENB Sync Requirements, 3rd Generation Partnership Project (3GPP), Mobile Competence Centre, 650, Route Des Lucioles, F-06921 Sophia-Antipolis Cedex, France, no. Miyazaki, Oct. 12, 2009, XP050393326, [retrieved on Oct. 6, 2009].

Qualcomm Europe: "Synchronization Requirements and Techniques", 3GPP Draft, R4-091336, 3rd Generation Partnership Project (3GPP), Mobile Competence Centre, 650, Route Des Lucioles, F-06921 Sophia-Antipolis Cedex, France, no. Seoul, Korea, Mar. 19, 2009, XP050342103. [retrieved on Mar. 19, 2009].

Universal Mobile Telecommunications System (UMTS), Physical layer, Measurements (TDD) (3GPP TS 25.225 version 8.2.0 Release 8), ETSI TS 125 225, ETSI Standard, European Telecommunications Standards Institute (ETSI), Sophia Antipolis Cedex, France, vol. 3-R1, No. V8.2.0, Mar. 1, 2009, XP014043978, paragraph [0007].

Co-pending U.S. Appl. No. 61/094,100, filed Sep. 4, 2008.

Motorola: "PCID confusion", R2-092307, 3GPP TSG RAN WG2 #65bis Mar. 23-27, 2009, Seoul, Korea, pp. 1-3.

Qualcomm Europe: "Network support for inbound handover of pre-Rel-9 UMTS UEs", R3-091213, 3GPP TSG RAN WG 3 #64, May 4-8, 2009 San Francisco, USA, pp. 1-3.

3GPP TR 36.922 version 9.0.0 Release 9; LTE; Evolved Universal Terrestrial Radio Access (E-UTRA);TDD Home eNode B (HeNB) Radio Frequency (RF) requirements analysis, ETSI TR 136 922 V9.0.0, pp. 1-77, Apr. 2010.

Damnjanovic et al., "A Survey on 3GPP Heterogeneous Networks", IEEE Wireless Communications, pp. 10-21 (Jun. 2011).

Domenico A.D., et al., "A Survey on MAC Strategies for Cognitive Radio Networks", IEEE Communications Surveys, IEEE, New York, NY, US, vol. 14, No. 1, Jan. 1, 2012, pp. 21-44, XP011420410, ISSN: 1553-877X, DOI: 10.1109/SURV.2011.111510.00108.

Yavuz M., et al.,"Interference management and performance analysis of UMTS/HSPA+ femtocells", IEEE Communications Magazine, IEEE Service Center, Piscataway, US, vol . 47, No. 9, Sep. 1, 2009, pp. 102-109, XP011283371, ISSN: 0163-6804, DOI: 10.1109/MCOM2009.5277462.

\* cited by examiner

METHOD AND APPARATUS FOR FACILITATING A HAND-IN OF USER EQUIPMENT TO FEMTO CELLS

CROSS-REFERENCE TO RELATED APPLICATIONS

This application claims the benefit of U.S. Provisional Patent application Ser. No. 61/151,469 entitled "Method and Apparatus to Enable Handoff for Mobile Stations in Active Call in UTRAN/UMTS Networks," which was filed Feb. 10, 2009, U.S. Provisional Patent application Ser. No. 61/173,115 entitled "Method and Apparatus to Enable Handoff for Mobile Stations in Active Call in UTRAN/UMTS Networks," which was filed Apr. 27, 2009, and U.S. Provisional Patent application Ser. No. 61/161,250 entitled "HNB Identification for UE Active Hand-Over," which was filed Mar. 18, 2009. The aforementioned applications are herein incorporated by reference in their entirety.

BACKGROUND

I. Field

The following description relates generally to wireless communications, and more particularly to methods and apparatuses for facilitating a hand-in of user equipment to femto cells.

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

In cellular networks, Macro Node Bs (MNBs) provide connectivity and coverage to a large number of users over a certain geographical area. A macro network deployment is carefully planned, designed and implemented to offer good coverage over the geographical region. While, such a careful planning is necessary, it however, cannot accommodate channel characteristics such as fading, multipath, shadowing, etc. especially in indoor environments. Indoor users, therefore, often face coverage issues (call outages, quality degradation) resulting in poor user experience.

Miniaturized base stations known as femto cells or Home Node Bs (HNBs) are expected to address this issue by extending cellular coverage inside buildings. Femto cells are a new class of base stations, which may be installed in a user's home and provide indoor wireless coverage to mobile units using existing broadband Internet connections.

However, an unplanned deployment of large numbers of HNBs will likely create several challenges that need addressing. For instance, when a mobile user gets close to a femto cell (e.g., cellular subscriber coming home), it may be desirable to enable a handover to that particular femto cell. It may be difficult though to uniquely identify the femto cell to facilitate such a handover. Typically in a macro network, identification of MNBs is achieved by assigning a unique primary scrambling code (PSC) to an MNB in a certain coverage area. However, this is not feasible in femto cell deployments due to the limited number of PSCs that are allocated and reused and small scale coverage of HNBs compared to MNBs. Therefore, simply using PSCs alone for HNB identification would result in ambiguities during an active hand-in procedure, wherein false HNB identification would result in severe network performance degradation.

It should also be noted that, upon relocating a user equipment (UE) in a CELL_DCH (Cell Dedicated Channel) state from a UMTS macro cell to an HNB cell, a combined SRNS (Serving Radio Network Subsystem) Relocation with hard hand-over is required, due to the lack of an Iur connection. For identifying the target of this relocation, the SRNC (Serving Radio Network Controller) can currently rely on either UE measurement reports and/or implicit OA&M (operations, administration, and management) mapping measurements to a target RNC (Radio Network Controller) to use in SRNS Relocation. Measurements currently only optionally provide the 28-bit global cell-id. In fact, the RANAP (Radio Access Network Application Part) measurement procedure assumes that the RNS (Radio Network Subsystem) never requests cell id reporting by the UE. Other measurable parameters (like PSC of the measured cell) might aid in narrowing down the candidate list of cells whose measurement are taken, but cannot guarantee the identification of the target HNB in an unrestricted HNB deployment. This leads to inefficiencies and ambiguities in RANAP signaling, as multiple candidate target HNBs may have to be prepared for handover. This problem is commonly known as the "PSC Confusion" problem.

Accordingly, it would be desirable to develop a method and apparatus for facilitating a hand-in of user equipment to femto cells, wherein the PSC confusion problem is resolved. The above-described deficiencies of current wireless communication systems are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with identifying a femto cell during a hand-in of user equipment. In one aspect, methods and computer program products are disclosed that facilitate a hand-in of user equipment to a femto cell. Within such embodiments, the femto cell is identified and a unique identifier is assigned to the femto cell. For this embodiment, the unique identifier is a function of a scrambling parameter and a timing parameter. A relationship between the unique identifier and the femto cell is then communicated.

In another aspect, an apparatus that facilitate a hand-in of user equipment to a femto cell is disclosed. Within such embodiment, the apparatus includes a processor configured to execute computer executable components stored in memory. The computer executable components include an identification component, an assignment component, and a transmitting component. The identification component is configured to identify the femto cell, whereas the assignment component is configured to assign a unique identifier to the femto cell. For this embodiment, the unique identifier is a function of a scrambling parameter and a timing parameter. The transmitting component is configured to communicate a relationship between the unique identifier and the femto cell.

In a further aspect, another apparatus that facilitate a hand-in of user equipment to a femto cell is disclosed. Within such embodiment, the apparatus includes means for identifying, means for assigning, and means for communicating. For this embodiment, the femto cell is identified and a unique identifier is assigned to the femto cell. For this embodiment, the unique identifier is a function of a scrambling parameter and a timing parameter. A relationship between the unique identifier and the femto cell is then communicated.

In another aspect, methods and computer program products are disclosed that facilitate a disambiguation of femto cells. Within such embodiments, a report associated with a target femto cell is received. For this embodiment, the report includes a plurality of attributes related to a signal broadcast by the target femto cell. An identifier associated with the target femto cell is then ascertained from at least one attribute included in the plurality of attributes. The target femto cell is then distinguished from at least one other femto cell based on the identifier.

An apparatus that facilitates a disambiguation of femto cells is also disclosed. Within such embodiment, the apparatus includes a processor configured to execute computer executable components stored in memory. The computer executable components include a receiving component, an ascertaining component, and a distinguishing component. The receiving component is configured to receive a report associated with a target femto cell. For this embodiment, the report includes a plurality of attributes related to a signal broadcast by the target femto cell. The ascertaining component is configured to ascertain an identifier associated with the target femto cell from at least one attribute included in the plurality of attributes. The distinguishing component is configured to distinguish the target femto cell from at least one other femto cell based on the identifier.

In a further aspect, another apparatus that facilitates a disambiguation of femto cells is disclosed. Within such embodiment, the apparatus includes means for receiving a report, means for ascertaining an identifier, and means for distinguishing a femto cell. For this embodiment, a report associated with a target femto cell is received. Here, the report includes a plurality of attributes related to a signal broadcast by the target femto cell. An identifier associated with the target femto cell is then ascertained from at least one attribute included in the plurality of attributes. The target femto cell is then distinguished from at least one other femto cell based on the identifier. In a further aspect, the apparatus includes means for compiling a list of candidate femto cells.

In another aspect, methods and computer program products are disclosed that facilitate identifying a femto cell. Within such embodiments, a communication is received, which includes a timing parameter, and a scrambling parameter is set. An offset related to the timing parameter is also ascertained. A signal including the scrambling parameter is then broadcast according to the offset.

An apparatus that facilitates identifying a femto cell is also disclosed. Within such embodiment, the apparatus includes a processor configured to execute computer executable components stored in memory. The computer executable components include a receiving component, a scrambling component, a timing component, and a transmitting component. The receiving component is configured to receive a communication that includes a timing parameter, whereas the scrambling component is configured to set a scrambling parameter. The timing component is configured to ascertain an offset related to the timing parameter. The transmitting component is configured to broadcast a signal according to the offset, wherein the signal includes the scrambling parameter.

In a further aspect, another apparatus that facilitates identifying a femto cell is disclosed. Within such embodiment, the apparatus includes means for receiving a communication, means for setting a scrambling parameter, means for ascertaining an offset, and means for broadcasting a signal. For this embodiment, a communication is received that includes a timing parameter, and a scrambling parameter is set. An offset related to the timing parameter is also ascertained. A signal including the scrambling parameter is then broadcast according to the offset. In a further aspect, the means for ascertaining includes means for selecting the offset and/or means for extrapolating the offset from the communication.

In another aspect, methods and computer program products are disclosed that facilitate performing a hand-in to a femto cell. Within such embodiments, a target femto cell is detected during an active call, and a global identifier associated with the target femto cell is ascertained. The global identifier is then reported to an external entity.

An apparatus that facilitates performing a hand-in to a femto cell is also disclosed. Within such embodiment, the apparatus includes a processor configured to execute computer executable components stored in memory. The computer executable components include a detection component, an identifier component, and a transmitting component. The detection component is configured to detect a target femto cell during an active call, whereas the identifier component is configured to ascertain a global identifier associated with the target femto cell. The transmitting component is configured to report the global identifier to an external entity.

In a further aspect, another apparatus that facilitates performing a hand-in to a femto cell is disclosed. Within such embodiment, the apparatus includes means for detecting a target femto cell, means for ascertaining a global identifier, and means for reporting the global identifier. For this embodiment, a target femto cell is detected during an active call, and a global identifier associated with the target femto cell is ascertained. The global identifier is then reported to an external entity. In a further aspect, the apparatus includes means for automatically ascertaining the global identifier upon a detection of a detected femto cell.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
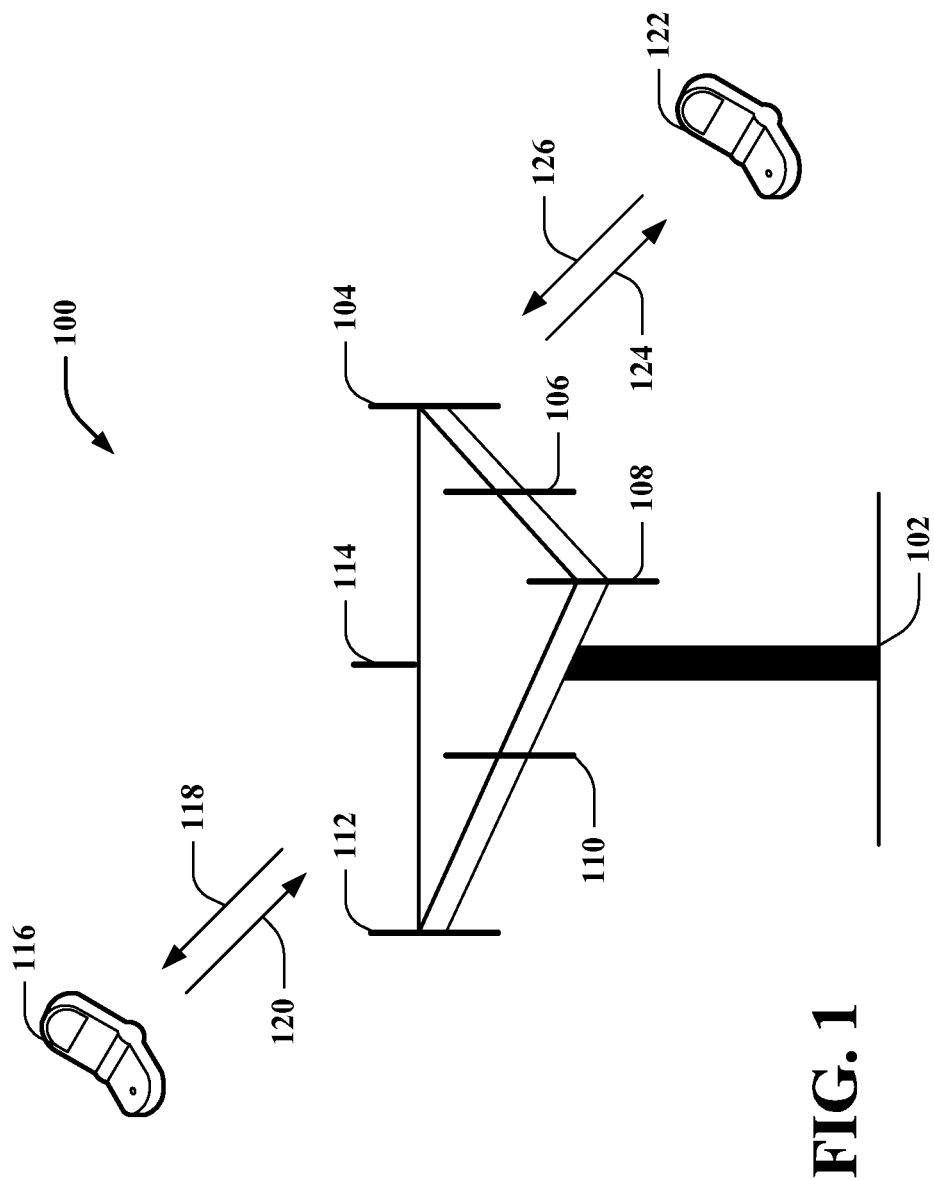
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

The subject specification discloses a method and a framework to uniquely identify Home NodeBs for enabling hand-in of User Equipment from a Macro NodeB to a Home NodeB in UMTS-Femtocell networks. Embodiments are also provided for addressing the aforementioned PSC confusion problem. In an aspect, the network comprises of User Equipment (UE), Macro NodeB (MNB), Home NodeB (HNB), Home NodeB management system (HMS), and Home Node-B gateway (HNB-GW). For hand-in purposes, the macro network (e.g., via source RNC (SRNC) or via the MNB) requests the UE to report detected HNBs in the vicinity. The UE performs slot, frame synchronization and obtains the primary scrambling sequence (PSC). Typically, in UTRA, PSCs are used to uniquely identify MNBs. However, since the number of HNBs in the system is much larger than the PSCs allotted for HNBs, this results in ambiguities during the HNB identification process at the MNB and/or target HNB-GW. This triggers false handoffs that result in degraded network performances.

The disclosed embodiments address the HNB identification ambiguity by assigning unique identification attributes to the HNBs. In an aspect, the HNB identification attributes are tuples taken from the cross product of a set of spreading sequences and a set of SFN offsets. A UE's report to the macro network (i.e., to the SRNC or MNB) contain the HNB identification attributes, which are retrieved to uniquely identify HNBs. The proposed approach is also applicable to legacy UEs and requires no standards, or macro network changes. In dense HNB deployments, or when HNB attribute assignment is not centralized, the cross-product tuples tremendously decrease the ambiguity in identifying the HNB.

Final identification can then be further resolved by the HNB sensing the uplink channels of the nearby UE.

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA), High Speed Packet Access (HSPA), and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

High speed packet access (HSPA) can include high speed downlink packet access (HSDPA) technology and high speed uplink packet access (HSUPA) or enhanced uplink (EUL) technology and can also include HSPA+ technology. HSDPA, HSUPA and HSPA+ are part of the Third Generation Partnership Project (3GPP) specifications Release 5, Release 6, and Release 7, respectively.

High speed downlink packet access (HSDPA) optimizes data transmission from the network to the user equipment (UE). As used herein, transmission from the network to the user equipment UE can be referred to as the "downlink" (DL). Transmission methods can allow data rates of several Mbits/s. High speed downlink packet access (HSDPA) can increase the capacity of mobile radio networks. High speed uplink packet access (HSUPA) can optimize data transmission from the terminal to the network. As used herein, transmissions from the terminal to the network can be referred to as the "uplink" (UL). Uplink data transmission methods can allow data rates of several Mbit/s. HSPA+ provides even further improvements both in the uplink and downlink as specified in Release 7 of the 3GPP specification. High speed packet access (HSPA) methods typically allow for faster interactions between the downlink and the uplink in data services transmitting large volumes of data, for instance Voice over IP (VoIP), videoconferencing and mobile office applications Fast data transmission protocols such as hybrid automatic repeat request, (HARQ) can be used on the uplink and downlink. Such protocols, such as hybrid automatic repeat request (HARQ), allow a recipient to automatically request retransmission of a packet that might have been received in error.

Various embodiments are described herein in connection with an access terminal. An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with access terminal(s) and can also be referred to as an access point, Node B, Evolved Node B (eNodeB) or some other terminology.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more access terminals such as access terminal 116 and access terminal 122; however, it is to be appreciated that base station 102 can communicate with substantially any number of access terminals similar to access terminals 116 and 122. Access terminals 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, access terminal 116 is in communication with antennas 112 and 114, where antennas 112 and 114 transmit information to access terminal 116 over a forward link 118 and receive information from access terminal 116 over a reverse link 120. Moreover, access terminal 122 is in communication with antennas 104 and 106, where antennas 104 and 106 transmit information to access terminal 122 over a forward link 124 and receive information from access terminal 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to access terminals in a sector of the areas covered by base station 102. In communication over forward links 118 and 124, the transmitting antennas of base station 102 can utilize beamforming to improve signal-to-noise ratio of forward links 118 and 124 for access terminals 116 and 122. Also, while base station 102 utilizes beamforming to transmit to access terminals 116 and 122 scattered randomly through an associated coverage, access terminals in neighboring cells can be subject to less interference as compared to a base station transmitting through a single antenna to all its access terminals.

Figure 2:
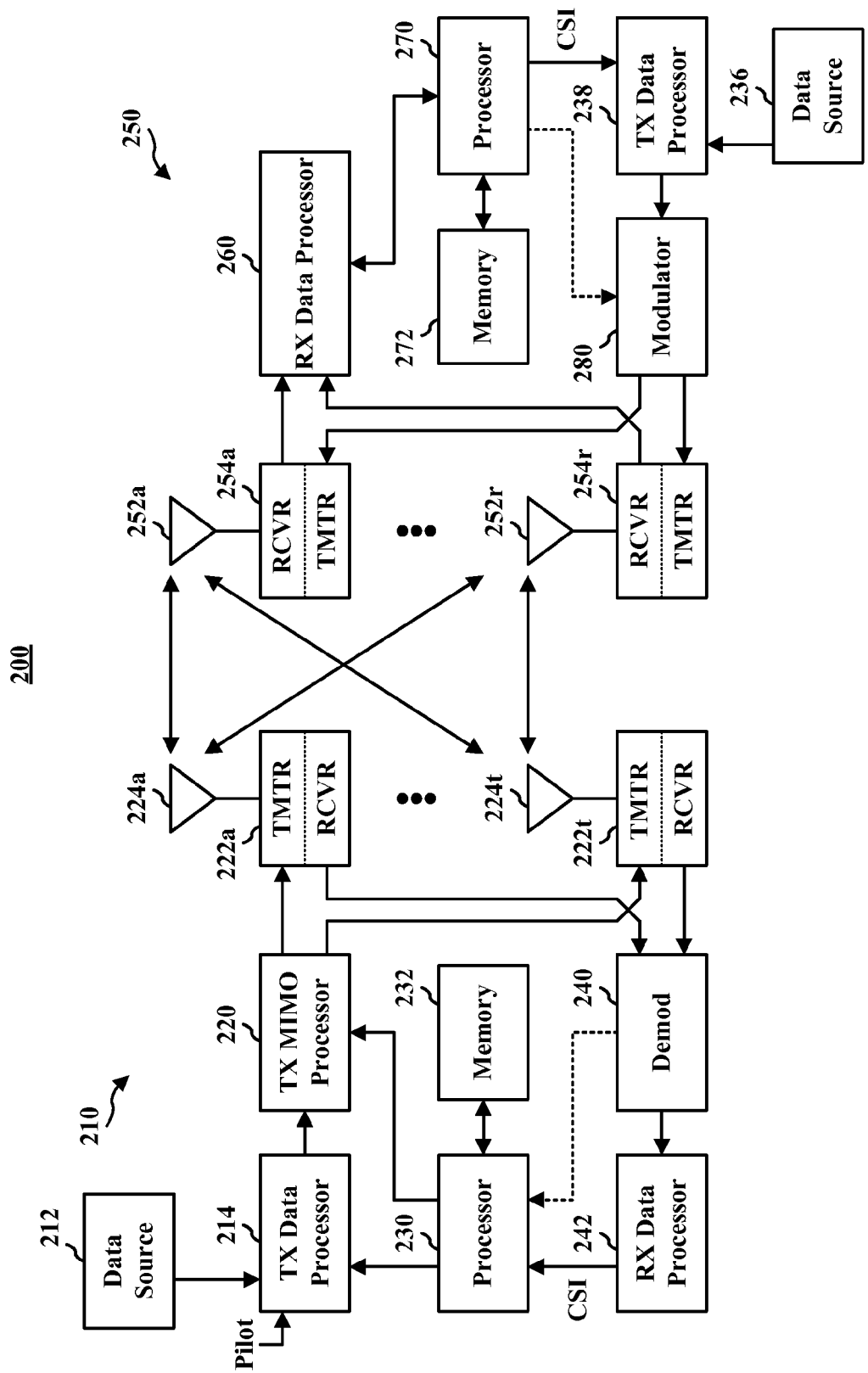
FIG. 2 is an illustration of an exemplary wireless network environment that can be employed in conjunction with the various systems and methods described herein.

FIG. 2 shows an example wireless communication system 200. The wireless communication system 200 depicts one base station 210 and one access terminal 250 for sake of brevity. However, it is to be appreciated that system 200 can include more than one base station and/or more than one access terminal, wherein additional base stations and/or access terminals can be substantially similar or different from example base station 210 and access terminal 250 described below. In addition, it is to be appreciated that base station 210 and/or access terminal 250 can employ the systems and/or methods described herein to facilitate wireless communication there between.

At base station 210, traffic data for a number of data streams is provided from a data source 212 to a transmit (TX) data processor 214. According to an example, each data stream can be transmitted over a respective antenna. TX data processor 214 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 250 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 230.

The modulation symbols for the data streams can be provided to a TX MIMO processor 220, which can further process the modulation symbols (e.g., for OFDM). TX MIMO processor 220 then provides $N_T$ modulation symbol streams to $N_T$ transmitters (TMTR) 222a through 222t. In various embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 222a through 222t are transmitted from $N_T$ antennas 224a through 224t, respectively.

At access terminal 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective signal, digitizes the conditioned signal to provide samples, and further processes the samples to provide a corresponding "received" symbol stream.

An RX data processor 260 can receive and process the $N_R$ received symbol streams from $N_R$ receivers 254 based on a particular receiver processing technique to provide $N_T$ "detected" symbol streams. RX data processor 260 can demodulate, deinterleave, and decode each detected symbol stream to recover the traffic data for the data stream. The processing by RX data processor 260 is complementary to that performed by TX MIMO processor 220 and TX data processor 214 at base station 210.

A processor 270 can periodically determine which available technology to utilize as discussed above. Further, processor 270 can formulate a reverse link message comprising a matrix index portion and a rank value portion.

The reverse link message can comprise various types of information regarding the communication link and/or the received data stream. The reverse link message can be processed by a TX data processor 238, which also receives traffic data for a number of data streams from a data source 236, modulated by a modulator 280, conditioned by transmitters 254a through 254r, and transmitted back to base station 210.

At base station 210, the modulated signals from access terminal 250 are received by antennas 224, conditioned by receivers 222, demodulated by a demodulator 240, and processed by a RX data processor 242 to extract the reverse link message transmitted by access terminal 250. Further, processor 230 can process the extracted message to determine which precoding matrix to use for determining the beamforming weights.

Processors 230 and 270 can direct (e.g., control, coordinate, manage, etc.) operation at base station 210 and access terminal 250, respectively. Respective processors 230 and 270 can be associated with memory 232 and 272 that store program codes and data. Processors 230 and 270 can also perform computations to derive frequency and impulse response estimates for the uplink and downlink, respectively.

Figure 3:
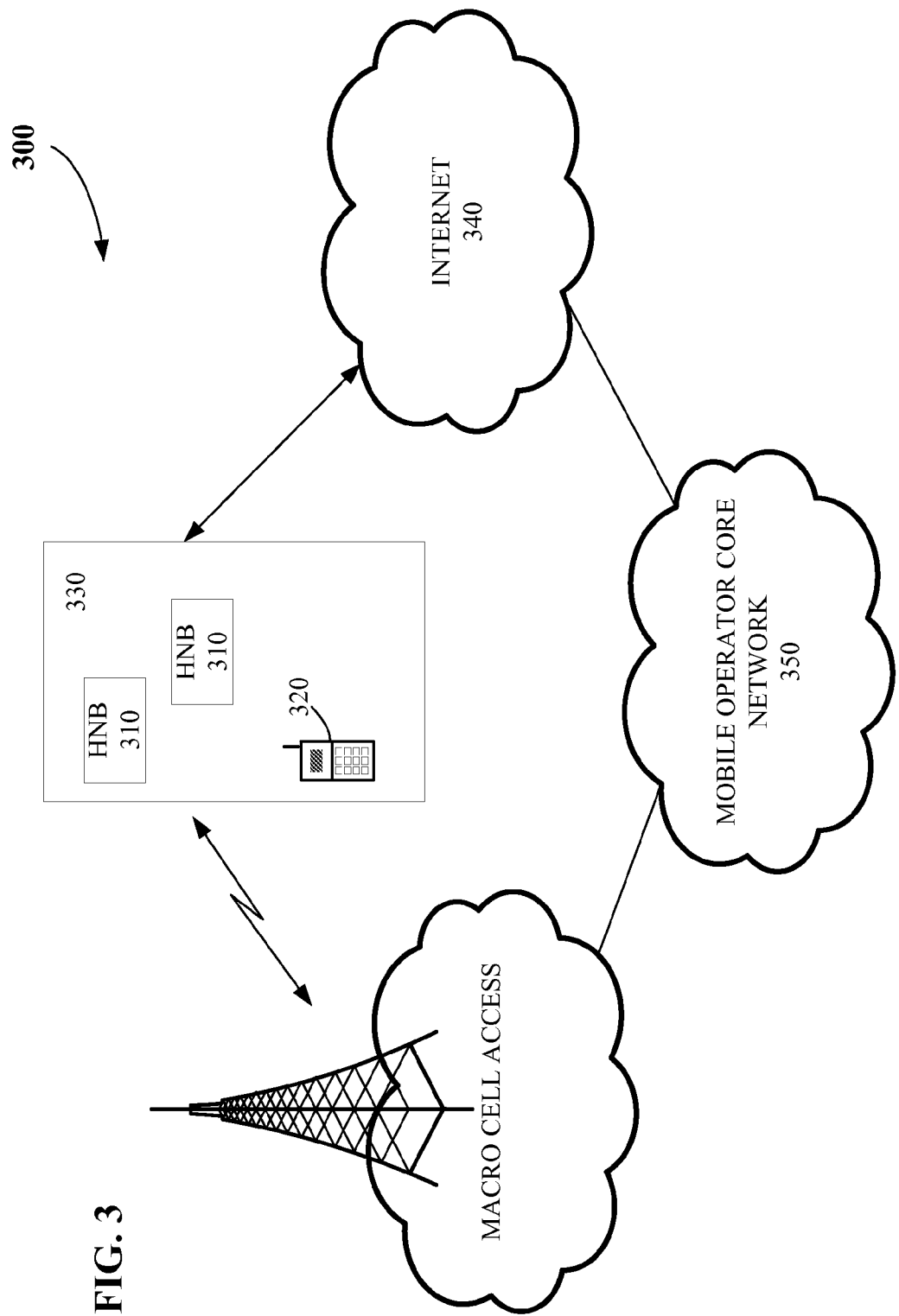
FIG. 3 illustrates an exemplary communication system that enables deployment of access point base stations within a network environment.

FIG. 3 illustrates an exemplary communication system to enable deployment of access point base stations within a network environment. As shown in FIG. 3, the system 300 includes multiple access point base stations or, in the alternative, femto cells, Home Node B units (HNBs), or Home evolved Node B units (HeNBs), such as, for example, HNBs 310, each being installed in a corresponding small scale network environment, such as, for example, in one or more user residences 330, and being configured to serve associated, as well as alien, user equipment (UE) or mobile stations 320. Each HNB 310 is further coupled to the Internet 340 and a mobile operator core network 350 via a DSL router (not shown) or, alternatively, a cable modem (not shown).

Figure 4:
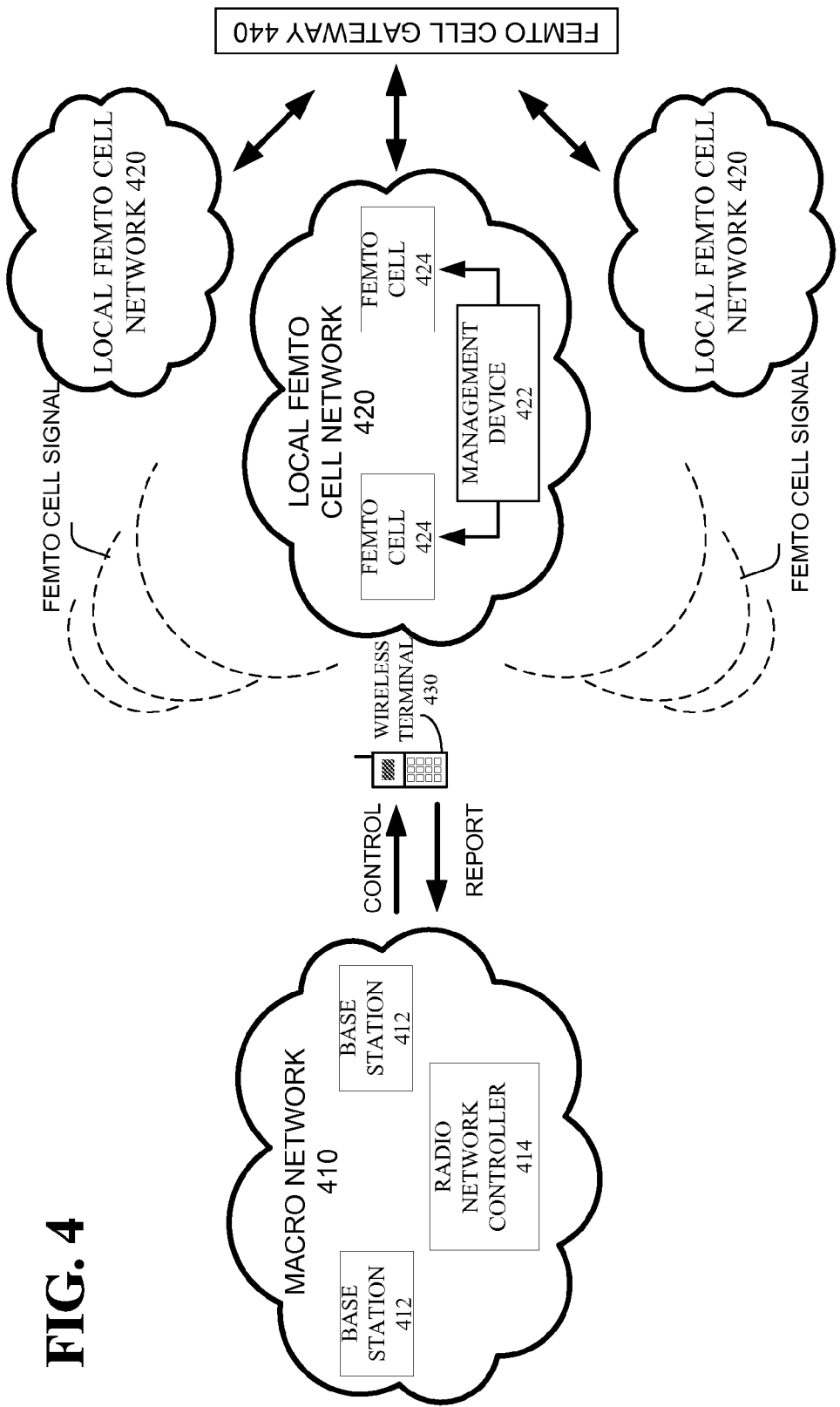
FIG. 4 is an overview of an exemplary system for facilitating a hand-in of user equipment to femto cells in accordance with an aspect of the subject specification.

Referring next to FIG. 4, an overview of an exemplary system for facilitating a hand-in of user equipment to femto cells in accordance with an aspect of the subject specification is provided. As illustrated, system 400 includes macro network 410, local femto cell networks 420, wireless terminal 430, and femto cell gateway 440. Within such embodiment, macro network 410 includes base stations 412 and radio network controller 414, wherein macro network 410 may facilitate an active communication (e.g., voice, data, etc.) with wireless terminal 430 via any of base stations 412. During the active communication, macro network 410 provides wireless terminal 430 with a control message, which directs wireless terminal 430 to scan for cells within a neighbor cell list including femto cells 424 within any of local femto cell networks 420. Based on macro network settings set by the control message, wireless terminal 430 then provides reports to macro network 410 indicating particular attributes and/or measurements associated with those signals, which may be subsequently used to readily identify a detected femto cell 424.

To facilitate such identification, each of femto cells 424 is configured to broadcast signals according to particular parameters assigned to the femto cell 424. For instance, in an embodiment, each of femto cells 424 is readily identifiable based on a primary scrambling code (PSC) reported by wireless terminal 430 coupled with measurements revealing a timing offset used to broadcast the femto cell signal.

As illustrated, local femto cell networks 420 communicate with femto cell gateway 440 and respectively include management device 422 and a plurality of femto cells 424. In an aspect, either of management device 422 and/or femto cell gateway 440 is configured to assign identifiers to femto cells 424, which femto cells 424 may then use to facilitate identifying themselves.

In an aspect, the various elements illustrated in FIG. 4 facilitate the unique identification of femto cells in different ways. In the discussion that follows, an element-by-element description of exemplary procedures performed by each element is provided.

First, the steps performed by a "Home Node B Management System" (HMS) (i.e., management device 422) are described, wherein the HMS administers the Home Node B (HNB) network (i.e., local femto cell networks 420). In an aspect, when a HNB is powered on, initialization messages are exchanged between the HMS and the HNB. For instance, signal quality measurement reports are collected that include, for example, RSSI (received signal strength indication), RSCP (received signal code power), Ec/Io (ratio of received pilot energy, Ec, to total received energy or the total power spectral density, Io), etc. of MNBs in the HNB's vicinity. Based on the reports, a macro node B (MNB) (i.e., base station 412) for the HNB can be assigned, wherein the HNB can select a set of suitable PSCs from the PSCs alloted to the HNBs. Within such embodiment, it should be appreciated that the set of primary scrambling codes that may be assigned to the HNBs are denoted as:

$$S := \{sc1, sc2, \ldots, scK\},$$

where K denotes the number of primary scrambling codes available (i.e., allocated to the HNBs).

For this embodiment, the set of primary scrambling codes selected by the HNB is sent to the HMS. After receiving the set of PSCs, the HMS looks for a suitable offset value ($\Delta$) to assign to the HNB, wherein the offsets are chosen from the set of integers between 0 and 255. Moreover, the set of offsets is defined as:

$$\Delta := [0, 1, \ldots, 255],$$

Next, primary scrambling codes and offset values are assigned to the HNBs. In a particular embodiment, a Cartesian product of S and $\Delta$ is taken, resulting in the set of HNB identifiers defined as:

$$HNBID := S \times \Delta := \{(0, sc_1), (0, sc_2), \ldots (255, scK)\}.$$

which contain pairs of spreading sequences and offset values.

The HMS then selects an unused pair from the HNBID set and assigns it to the HNB. Here, it should be noted that the length of the HNBID set depends on the length of the set S and $\Delta$. In an aspect, a pair from HNBID is chosen and assigned to the HNB during the initialization phase of the HNB. In another aspect, however, the HNB is allowed to pick an identifier from the $\Delta$ set at random. The list of HNBs and associated HNBID can also be sent to the MNB.

Next, the set-up procedure performed by an exemplary HNB-GW (i.e., femto cell gateway 440) is described. Here, it should be appreciated that the HNB-GW may perform all or a subset of the procedures described for the HMS. In an aspect, the HNB-GW assists with the setup procedure by compiling different types of information. For instance, HNB-GW can compile vicinity measurements received from the HNB.

The HNB-GW may also compile a neighborhood topology graph based on HNB measurement reports. For such embodiment, a few assumptions are contemplated. For instance, with reference to the topological graph illustrated in FIG. 5, it is assumed that Home Node 510 declares neighbors Macro Node 512, Macro Node 522, and Home Node 530, whereas Home Node 520 declares neighbors Macro Node 522 and Macro Node 532.

By compiling a topology graph, various types of associative information can be ascertained. For instance, stand-alone information can be associated with nodes, such as PSC and cell id. In an aspect, bidirectional relative information is also associated with the links, such as $SFN_{node1} - SFN_{node2}$. In another aspect, unidirectional information can also be associated (e.g., Ec/Io, RSSI, etc.), in which case a perspective from which the information was collected should be specified.

Figure 5:
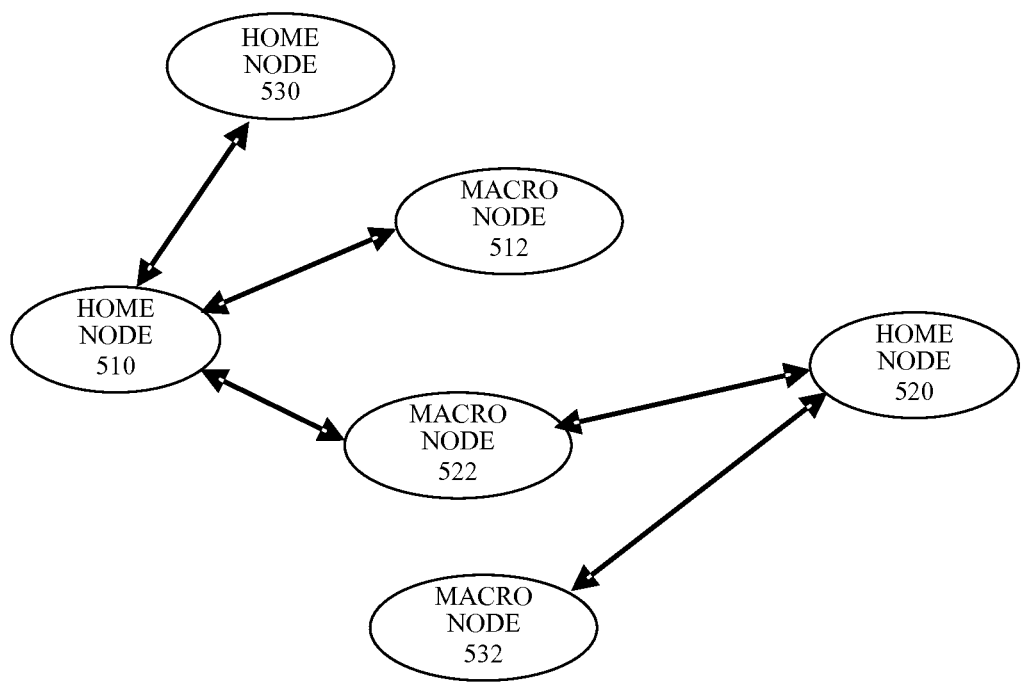
FIG. 5 illustrates an exemplary topological representation of nodes in accordance with an aspect of the subject specification.

One of ordinary skill in the art will appreciate that such a topological representation can be useful to derive information that may otherwise not be available locally in an HNB. In FIG. 5, for example, if a UE (i.e., wireless terminal 430) is approaching Home Node 510 and only Macro Node 532 was included in the measurement report, the topological representation could identify Home Node 510 as a candidate for hand-over, by obtaining:

$$(SFN_{HNB510} - SFN_{MNB532}) - (SFN_{HNB510} - SFN_{MNB522}) - (SFN_{HNB520} - SFN_{MNB522}) + (SFN_{HNB520} - SFN_{MNB532}).$$

Here, it should be noted that for the above calculation to be possible, Home Node 510 and Macro Node 532 need to be connected via links. Also, since the macro network is not expected to be synchronized, at most one link at each node can be synchronized. Furthermore, the time drift of the SFN difference on all other links must be tracked.

It should be further noted that the NodeB neighborhood illustrated in FIG. 5 may be restricted to MNB neighbors of HNBs, which could be useful in a deployment where HNBs have visibility of most or all MNBs in the neighborhood. In another aspect, the NodeB neighborhood may contain HNB neighbors of HNBs, which could be useful to limit the number of links to be traversed for the SFNnode1–SFNnode2 calculation to be performed.

Next, the steps performed by an HNB are described. In an exemplary embodiment, after the initial slot and frame synchronization and code group identification, the HNB detects the Primary Common Control Physical Channel (P-CCPCH) and obtains system and cell specific BCH (Broadcast Channel) information. In an aspect, the SFN of the MNB is sent on the BCH transport channel approximately every twenty milliseconds. For this embodiment, the BCH is mapped to P-CCPCH, wherein the SFN is incremented approximately every ten milliseconds and repeats every 40.96 seconds. Therefore, the range of SFN is [0, . . . , 4095].

In another aspect, the HNB obtains the SFN of the MNB and sets its own SFN based on the offset provided by the HMS. This can be done as follows:

$$if (\Delta > SFN_{MNB})$$

$$SFN_{HNB} = 4096 + SFN_{MNB} - \Delta;$$

$$else$$

$$SFN_{HNB} = SFN_{MNB} - \Delta;$$

Here, it should be noted that the above algorithm does not suffer from time drifts since $SFN_{HNB}$ can be easily synchronized and tracked with the increments of $SFN_{MNB}$, which is sent at regular intervals on the downlink channel. In an aspect, the SFN initialization procedure is carried out by all HNBs alike, and every HNB is assigned a SFN.

In addition to the above procedures, HNBs may also detect and measure other cells in the vicinity. This includes HNBs and MNBs. In an exemplary embodiment, such cell detection and measurement procedures may be carried out by the "network listen" module present in the HNB. In another embodiment, it may be carried out via UE measurement reports.

Here, it should be noted that such UE measurement reports can also be used by the SRNC (i.e., radio network controller 414) to collect similar HNB-identifying information. This could be considered for HNB identification at the SRNC, if macro changes are acceptable. Alternatively, the SRNC can be informed of a HNB's neighborhood via: RANAP-style Iur messaging (through CN (Core Network node) from HNB/NB-GW/OAM); signalling directly from OAM (from HMS); or a direct link with the HNB or HNB-GW (e.g. if the SRNC is simply another HNB).

HNBs may also be used to ascertain various measurements of cells in its neighborhood. For instance, a HNB measurement may include the PSC, SFN, Ec/Io, RSSI of all detected cells in its neighborhood. These measurements may be periodically sent to the HMS and/or HNB-GW.

In an aspect, the HNB-GW can therefore have a neighborhood mapping for each HNB, as well as a topological representation of the neighborhood. This can be in terms of PSC and/or SFN information as mentioned above.

In a further aspect, where centralized SFN allocation is not possible (via HMS or HNB-GW), HNBs can randomly or in a distributed manner set up their SFNs with respect to detected neighboring MNBs or HNBs. While such a distributed allocation may fail to ensure uniqueness, it would help narrow down the list of HNB candidates of a handover attempt.

Next, the steps performed by the UE are described, wherein these steps may be followed by legacy UEs. In an active call, a UE is connected to a MNB and is in Cell_DCH or Cell_FACH (Cell Forward Link Access Channel). The UE receives a request from the macro network (SRNC or MNB) to measure and report NodeBs (Macro or Home) in the vicinity. This is achieved by configuring intra or inter frequency or inter RAT (Radio Access Technology) events. The SRNC provides PSC information via a neighbor cell list or measurement control messages.

In an embodiment, the UE performs a three-stage synchronization procedure and obtains measurements for each PSC. The measurements may include: PSC, SFN_cell–CFN, Ec/Io, RSSI, and/or PL. The UE may then send the following information to the SRNC. First, in the UE's MRM sent on the RACH, the UE may include PSC, SFN-CFN time difference (Cell_DCH), Ec/Io, RSSI, and/or PL (path loss) of the monitored cells Node B (macro or home). Second, the SRNC may request additional measurements through the MCM, wherein the MCM contains, among other PSCs, a measurement request for the serving MNB. Within such embodiment, the UE performs measurements and sends MRM to the SRNC, wherein the MRM sent over the RACH (Random Access Channel) may contain measurements of up to the six strongest neighbor cells. And third, it is useful to have MRMs of all active UEs sent to the SRNC to be made available at the HNB-GW.

Next, the steps performed by the SRNC and HNB-GW are described. In an aspect, the SRNC obtains the UE reports and initiates SRNS relocation. The SRNC may then send the UE's MRMs to the HNB-GW. From the MRMs, the HNB-GW can then extract the HNBID. To illustrate this consider the following example.

Suppose HNB1 is assigned an identifier {sc1, Δ1}. When a UE approaches HNB1, intra or inter frequency measurements are triggered. The UE measures cells sent on the NCL or MCM and sends an MRM containing an entry for HNB1: {sc1, CFN–$SFN_{HNB1}$, Ec/Io1, RSSI1, ... }. The SRNC then configures the MCM providing the MNB PSC (sc2 for instance). The UE's MRM then contains the entry for MNB: {sc2, CFN–$SFN_{mNB}$, Ec/Io2, RSSI2, ... }.

The SRNC then initiates SRNS relocation and sends the two UE reports (possibly in a single MRM) to the HNB-GW. The HNB-GW then extracts sc1 from the first MRM, as well as the difference between the system frame numbering from the two reports. Namely, $$|CFN - SFN_{HNB1} - CFN + SFN_{MNB}| = SFN_{MNB} - SFN_{HNB1} = \Delta 1$$

From {sc1, Δ1}, the HNB-GW can then identify the target HNB (i.e., HNB1 in the above example).

In the cases where the MNB was not detected by HNB1 as part of its neighborhood, the HNB-GW can use the topological representation to obtain Δ1. In general, the higher the number of topological links that are traversed, the poorer the HNB disambiguation capability becomes (since PSC, ΔSFN)-tuples are used to disambiguate over a wider area.

To minimize the number of links that must be traversed to compute Δ1, additional criteria can be considered to ensure that a HNB is indeed a potential hand-over candidate. Such criteria may, for example, include using RSCP or Ec/N0 reports from UE MRMs and similar reports stored for the potential candidate HNBs. This would generally increase the likelihood that the UE is in the vicinity of the potential candidate HNB. In another aspect, a lower detection threshold may be allowed for the collection of a HNB's neighborhood list (via DL receiver, or UE measurements). In yet another aspect, information from UE MRMs received from other nodes may also be used (e.g. via SRNS relocation signaling).

It should be appreciated that the number of maximum links MaxLinksHNB to traverse from a HNB for calculating:

$$\Delta SFN = SFN_{HNB} - SFN_{sourceNB}$$

can be used to at least partially define the neighborhood of that HNB. For instance, if more than $MaxLinks_{HNB}$ links need to be tranversed, then sourceNB is not part of HNB's neighborhood. HNB would then not be considered as a possible target candidate for UEs handing over from sourceNB.

To further reduce call drops from an incorrect HNB identification, any of the HNB-GW, HNB or SRNC can further record the MRMs corresponding to successful and failed handover events. Without limiting generality, a method of using such information could be:

Successful Handover⇒use MRM to augment the HNB's neighbor list.

Failed Handover⇒use MRM in conjunction with UE IMSI to prevent incorrect HNB identification in the future for specific UEs.

This solution can be implemented without requiring any macro or standard changes. If macro changes are considered, the above procedure can be performed at the SRNC.

Next, the steps performed by the MNB are described. In an aspect, upon obtaining UE's report, the MNB retrieves the offset and scrambling code information. The MNB then checks if the scrambling code falls in its code group-id and then identifies the HNB based on the identifier: HNBID. If a match is found, then a hard hand off procedure is initiated. On the other hand, if the PSC is not in its code group-id then the MNB sends the (offset, scrambling code) information to the HMS, which then would resolve the correct HNB and initiate hard handoff.

PSC Confusion Solution for Pre-Release 9 UEs

Figure 6:
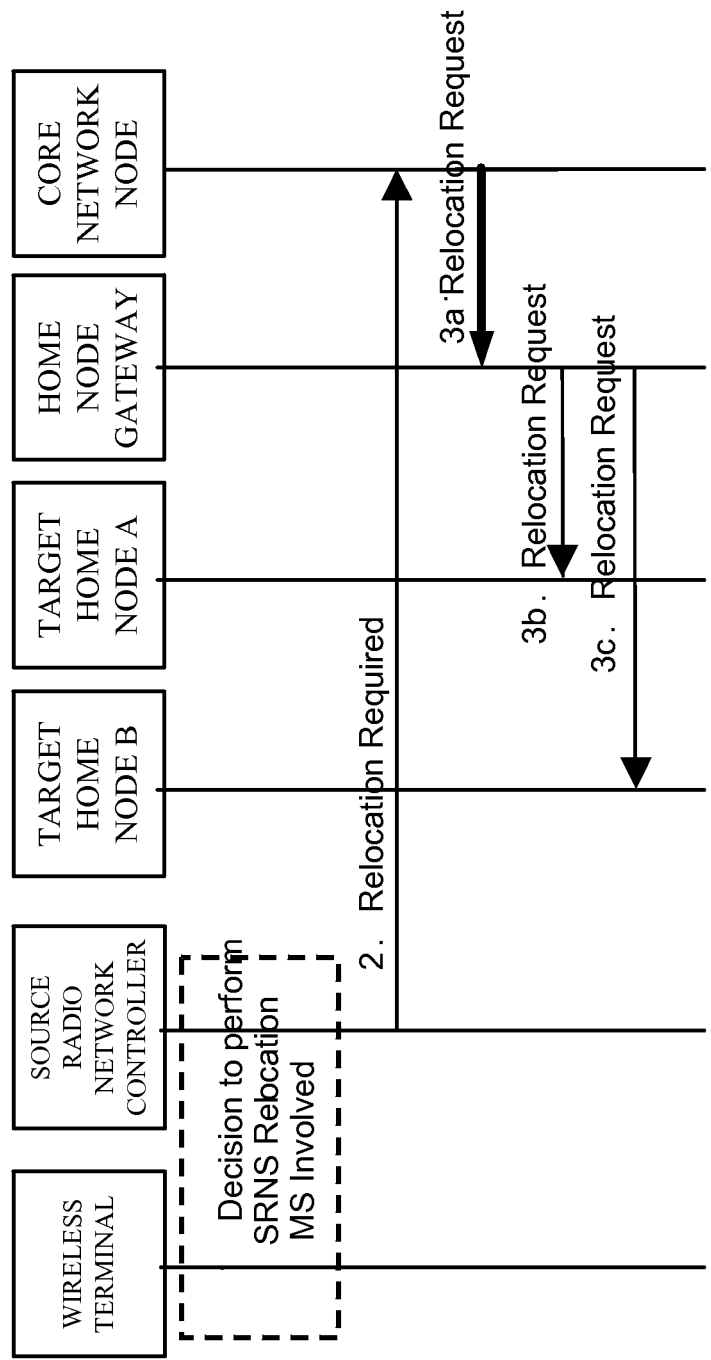
FIG. 6 illustrates an exemplary initiation of a relocation procedure, which includes femto cell target candidates.

Aspects for addressing the PSC confusion issue with respect to pre-Release-9 UEs are now discussed. In these aspects, normal hand-over initiation using RANAP Relocation procedures is considered, as in FIG. 6. The case where the HNB-GW can be uniquely identified by virtue of deployment choice is also considered, wherein it is assumed that the HNB-GW forwards the relocation requests to all candidate target HNBs.

In Release-8, a "Source RNC to Target RNC Transparent Container" is used by the RANAP Relocation procedure to supply a 28-bit Target Cell ID to the HNB-GW. However, the actual target Cell ID may be unknown, due to the PSC confusion problem.

Given the lack of a target cell-id, it is contemplated that the following information can be made available to the HNB-GW to support disambiguation. First, the PSC of the target cell that triggered the relocation request can be made available. In an aspect, the PSC is available from the optionally included measurement report (at most nine bits, but could be less), wherein it is noted that the disambiguation problem is aggravated if this information is not included.

Second, the identity or location of the source (macro) cell can also be made available to the HNB-GW. If the source cell id is available, the HNB-GW can correlate it with Radio Environment Measurements from the HNB (HNBAP changes may be needed to make these measurements mandatory at HNB Registration time, and possibly also through post-registration updates). Such a "macro to HNB-candidate set" mapping at the HNB-GW, along with HNB PSC information, helps narrow down the target HNBs.

In order to mitigate the disambiguation problem, various methods for providing the above information to the HNB-GW are contemplated. For instance, the global cell id of the source (macro) cell can be sent in the "Source RNC to Target RNC Transparent Container". Within such embodiment, a new IE, or the existing Target Cell Id could be used for that purpose. The information can also be provided by making it mandatory for the SRNC to provide the measurement report with the target HNB's PSC.

In another aspect, the disambiguation problem is mitigated by forwarding the RANAP Relocation to all potential HNBs. For this embodiment, the HNBs are relied upon to notify the HNB-GW whether they are candidates or not. Additional measurements (e.g. CFN–SFN difference) can also be included in the RANAP Relocation message, as well as corresponding information to correlate with on the HNBAP side, to further narrow down the list of candidate HNBs.

In further aspects, prior to a handover, an uplink synchronization can be attempted on the target candidate HNBs (as derived from the RANAP Relocation information) to further narrow down the list of handover candidate HNBs. The target HNBs can also be ranked based on UE measurements, as well as HNB-UE uplink synchronization results.

Figure 7:
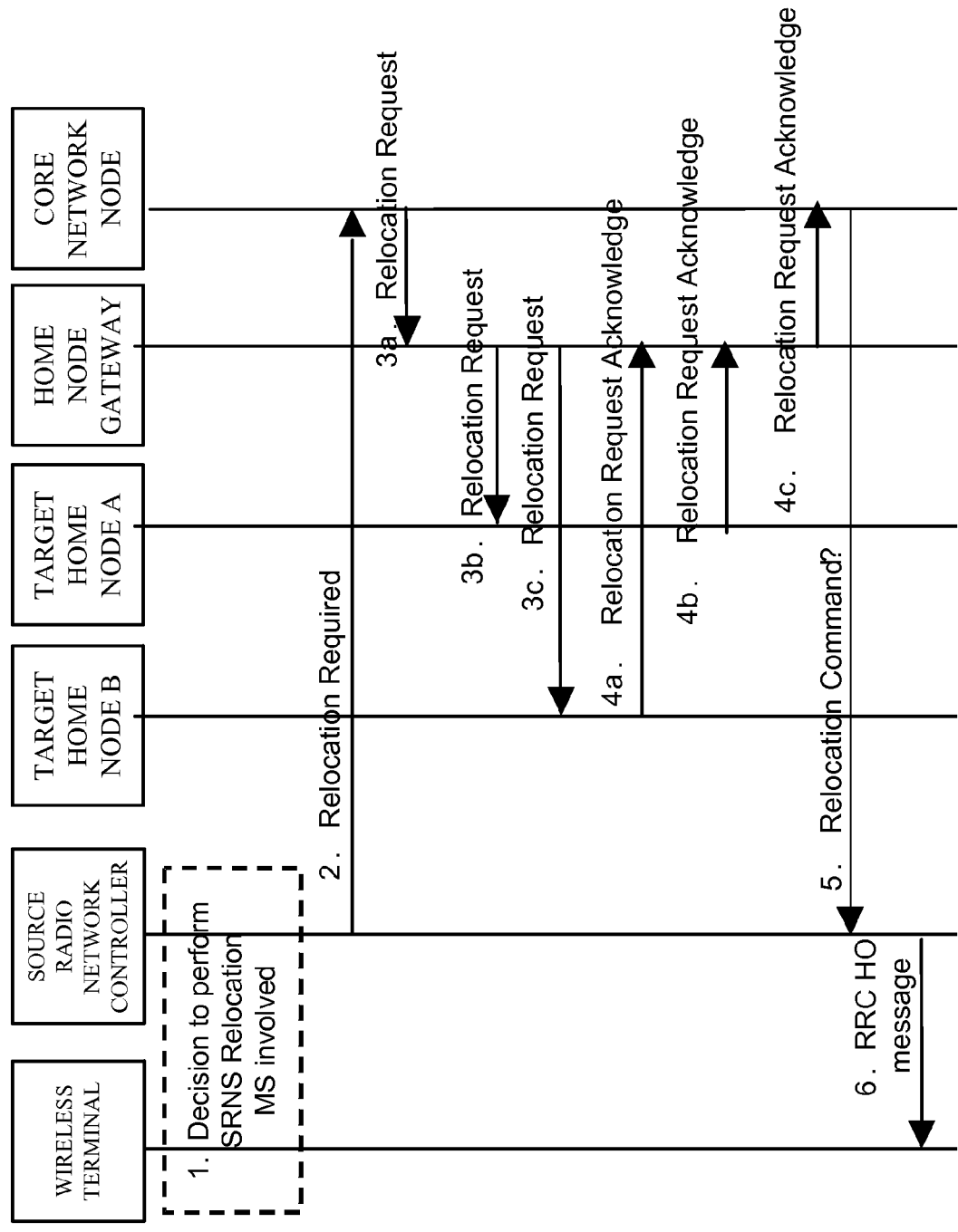
FIG. 7 illustrates another exemplary relocation procedure, which includes femto cell target candidates.

Referring next to FIG. 7, an exemplary relocation procedure is shown, which includes femto cell target candidates. Following the Rel-8 RANAP Request procedure, each of the candidate HNBs acknowledges the Relocation Request, by including an RRC Handover message for the SRNC to apply to the UE (i.e., in the "Target RNC to Source RNC Transparent Container"). If a single target HNB cell was identified, the solution is straightforward. If, however, multiple candidate target HNBs were identified, different RRC Handover messages may be received by the HNB-GW through RANAP acknowledgments from the target candidate HNBs. Below, a discussion of which, if any, of these RRC Handover messages should the HNB-GW forward to the SRNS through the CN is provided.

In a first embodiment, all HNBs are required to have a standard acknowledgement RB setup (e.g. a DCH R99). Within such embodiment, each HNB is able to reconfigure the UE after it hands over from the SRNS.

Another possibility is to have the HNB-GW rank the target candidate HNBs. For this embodiment, the HNB-GW can be configured to only prepare relocations in an order of likelihood ranking one HNB at a time (or alternatively by groups). Here, if the relocation was prepared in the incorrect HNB, the CELL_DCH UE will revert to the source, in which case the SRNS will have to allow relocation to be re-tried to the next candidate HNBs. The SRNS may also need to notify the HNB-GW of the failure.

In yet another aspect, relocation is handled according to whether the UE has access to the candidate HNBs. In this case, it is proposed to prepare (simultaneously or sequentially) only the cells where the UE is allowed access. For this embodiment, if the CELL_DCH UE hands over to a HNB where it does not have access, the UE will revert to the source, and the relocation can be further handled as described previously.

In summary, various embodiments are disclosed to solve the PSC confusion problem with respect to pre-Release-9 UEs. For instance, when a relocation target is a HNB, an embodiment was provided in which the source global cell-id is made available to the HNB-GW. An embodiment was also disclosed in which the HNB provides its Radio Environment Measurements to the HNB-GW, as well as where the HNB-GW only prepares the relocation for target HNBs where the UE is allowed access.

In circumstances where the target cell id cannot be made available to the HMB-GW, an embodiment was disclosed in which the HNB-GW is provided with the target PSC. If the relocation was triggered by a UE measurement report, this is achievable by including it in the RANAP Relocation. Currently, the inclusion of that measurement is optional.

Embodiments were also disclosed in which the HNB-GW ranks candidate HNBs based on the likelihood of being the target HNB. Here, such likelihood can be established based on, for instance, UE received power at the HNB and/or on UE measurements. For this embodiment, the HNB-GW may attempt relocation to one or multiple candidate target HNBs at a time, in ranking order PSC Confusion Solution for Release 9+ UEs For Release-9+UEs, embodiments for solving the PSC confusion issue include making the global cell-id of the target HNB available, wherein the global cell-id uniquely identifies the HNB to the SRNS when the handover decision is made. For this embodiment, the cell id of the target HNB is broadcast in SIB3/4. Making this cell id available to the SRNS would solve the PSC problem. Current UEs in CELL_DCH already have the capability to read the BCCH logical channel (where the SIBs are broadcast), wherein the UE reports the SFN of the target cell to report the CFN-to-SFN difference for soft hand-over support. The PSC confusion problem can then be solved by allowing the SRNS to ask for cell-id reporting in UE measurements. In an aspect, however, the SRNC asks the UE to only report the cell ids of those cells where there is an ambiguity in the identity of the handover candidate cell.

Exemplary Embodiments

Figure 8:
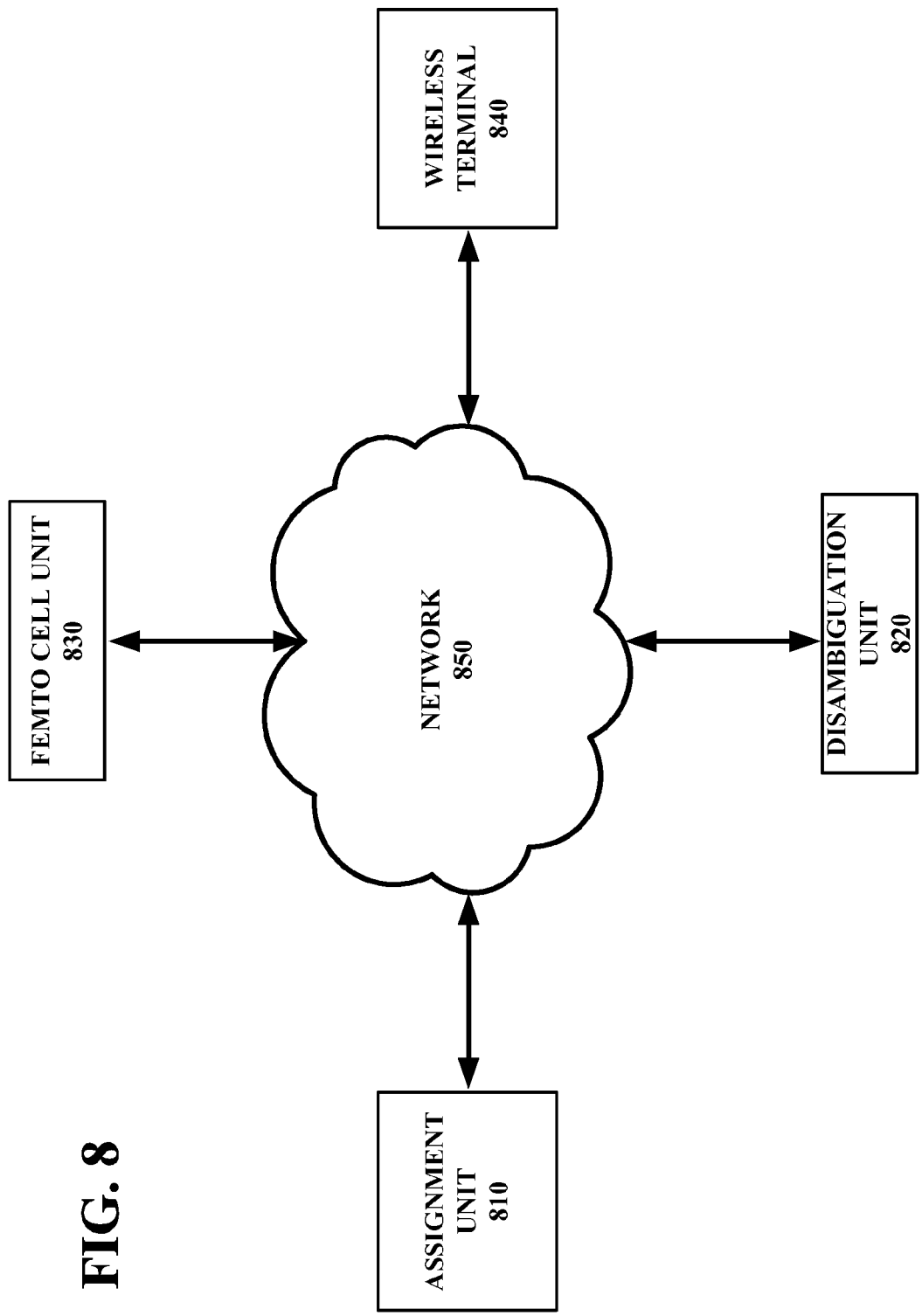
FIG. 8 illustrates an exemplary environment for facilitating a hand-in of user equipment to femto cells in accordance with an embodiment.

Referring next to FIG. 8, an exemplary environment for facilitating a user equipment hand-in to a femto cell is provided. As illustrated, environment 800 includes assignment unit 810, disambiguation unit 820, femto cell unit 830, and wireless terminal 840. For this embodiment, each of assignment unit 810, disambiguation unit 820, femto cell unit 830, and wireless terminal 840, are communicatively coupled to each other via network 850. A detailed description of each component is provided below.

Figure 9:
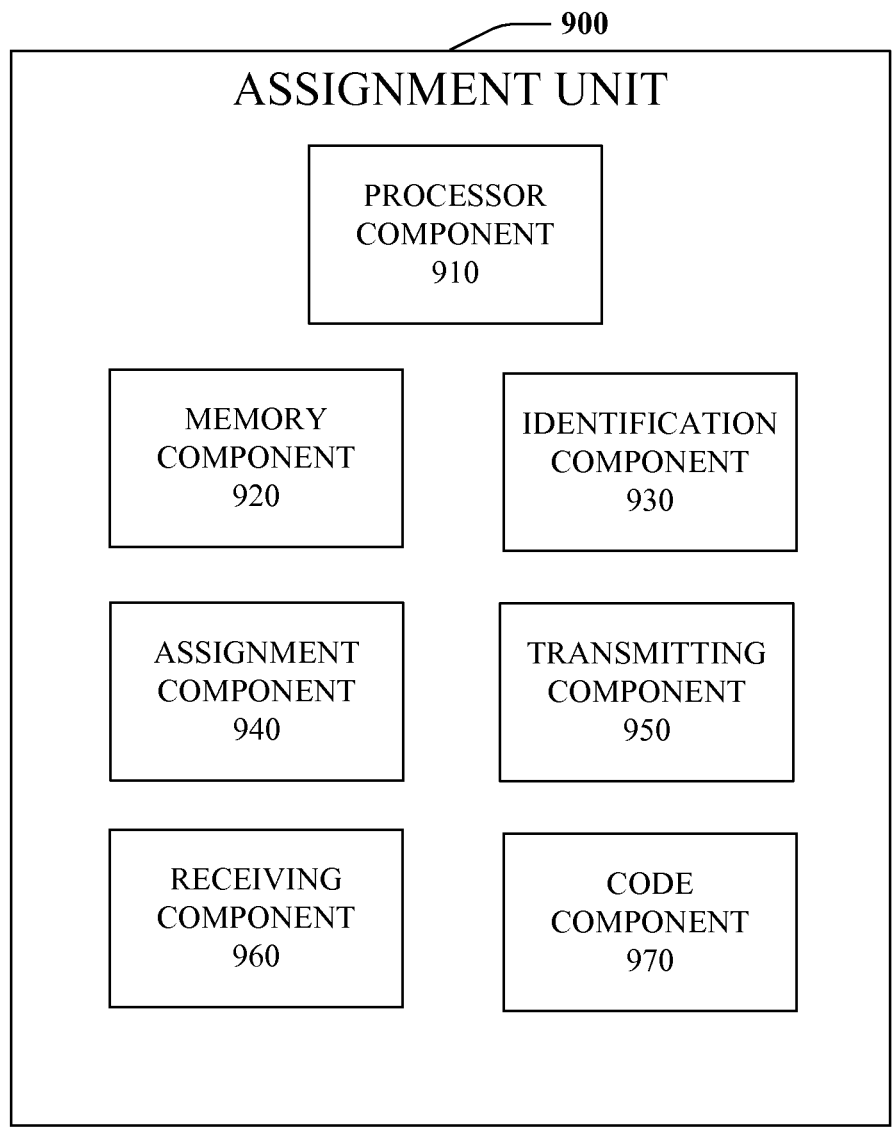
FIG. 9 illustrates a block diagram of an exemplary assignment unit that facilitates a hand-in of user equipment to a femto cell in accordance with an aspect of the subject specification.

Referring next to FIG. 9, a block diagram of an exemplary assignment unit that facilitates a hand-in of user equipment to a femto cell according to an embodiment is provided. As shown, assignment unit 900 may include processor component 910, memory component 920, identification component 930, assignment component 940, transmitting component 950, receiving component 960, and code component 970.

In one aspect, processor component 910 is configured to execute computer-readable instructions related to performing any of a plurality of functions. Processor component 910 can be a single processor or a plurality of processors dedicated to analyzing information to be communicated from assignment unit 900 and/or generating information that can be utilized by memory component 920, identification component 930, assignment component 940, transmitting component 950, receiving component 960, and/or code component 970. Additionally or alternatively, processor component 910 may be configured to control one or more components assignment unit 900.

In another aspect, memory component 920 is coupled to processor component 910 and configured to store computer-readable instructions executed by processor component 910. Memory component 920 may also be configured to store any of a plurality of other types of data including data generated by any of identification component 930, assignment component 940, transmitting component 950, receiving component 960, and/or code component 970. Memory component 920 can be configured in a number of different configurations, including as random access memory, battery-backed memory, hard disk, magnetic tape, etc. Various features can also be implemented upon memory component 920, such as compression and automatic back up (e.g., use of a Redundant Array of Independent Drives configuration).

As illustrated, assignment unit 900 may also include identification component 930 and assignment component 940. Within such embodiment, identification component 930 is configured to identify a femto cell, whereas assignment component 940 is configured to assign a unique identifier to the femto cell. For this embodiment, the unique identifier is a function of a scrambling parameter and a timing parameter. For example, the unique identifier may be ascertained by combining the scrambling parameter with the timing parameter.

In another aspect, assignment unit 900 includes code component 970, which is configured to ascertain a primary scrambling code. Here, the primary scrambling code ascertained by code component 970 corresponds to a macro node associated with the femto cell (e.g., a macro node having a coverage area that encompasses the femto cell). For this embodiment, the scrambling parameter utilized by assignment component 940 to obtain the unique identifier is based on the primary scrambling code.

In yet another aspect, transmitting component 950 and receiving component 960 are coupled to processor component 910 and configured to interface assignment unit 900 with external entities. For instance, transmitting component 950 may be configured to communicate a relationship between the unique identifier and the femto cell (e.g., communicating to the femto cell and/or an external entity that the unique identifier is assigned to this particular femto cell), whereas receiving component 960 may be configured to receive a selection of a primary scrambling code from the femto cell (i.e., to facilitate ascertaining the unique identifier).

Figure 10:
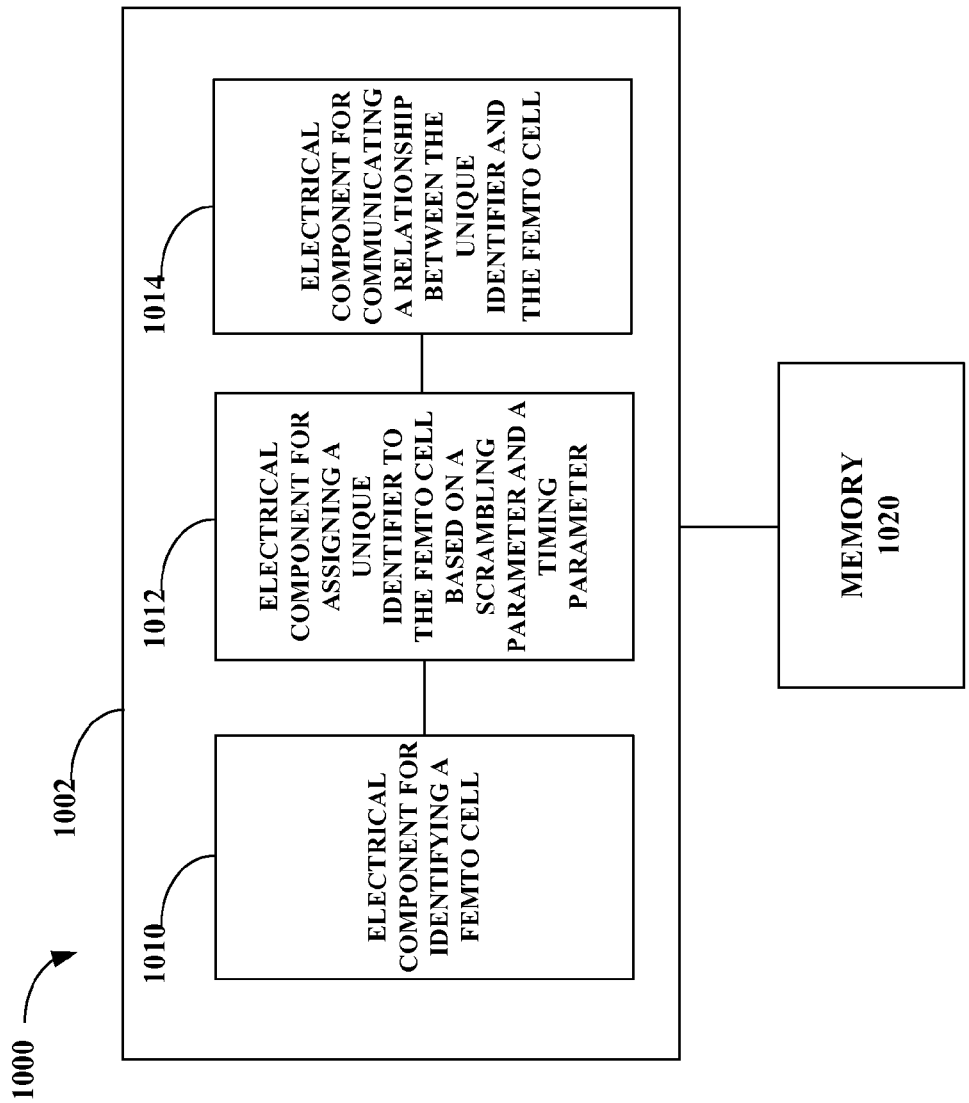
FIG. 10 is an illustration of an exemplary coupling of electrical components that effectuate facilitating a hand-in of user equipment to a femto cell.

Turning to FIG. 10, illustrated is a system 1000 that facilitates a hand-in of user equipment to a femto cell according to an embodiment. System 1000 can reside within assignment unit 900 (e.g., femto cell gateway 440 and/or management device 422) or a computer-readable storage medium, for instance. As depicted, system 1000 includes functional blocks that can represent functions implemented by a processor, software, or combination thereof (e.g., firmware). System 1000 includes a logical grouping 1002 of electrical components that can act in conjunction. As illustrated, logical grouping 1002 can include an electrical component for identifying a femto cell 1010. Furthermore, logical grouping 1002 can include an electrical component for assigning a unique identifier to the femto cell based on a scrambling parameter and a timing parameter 1012. Logical grouping 1002 can also include an electrical component for communicating a relationship between the unique identifier and the femto cell 1014. Additionally, system 1000 can include a memory 1020 that retains instructions for executing functions associated with electrical components 1010, 1012, and 1014. While shown as being external to memory 1020, it is to be understood that electrical components 1010, 1012, and 1014 can exist within memory 1020.

Figure 11:
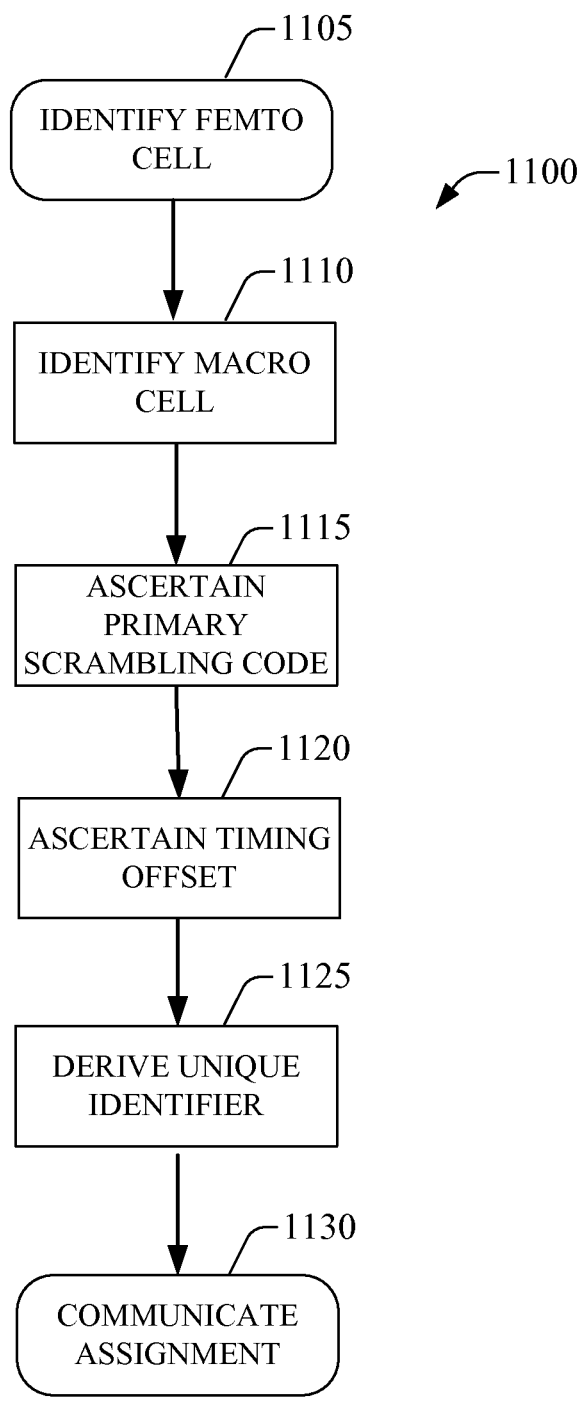
FIG. 11 is a flow chart illustrating an exemplary methodology for facilitating a hand-in of user equipment to a femto cell in accordance with an aspect of the subject specification.

Referring next to FIG. 11, a flow chart illustrating an exemplary method for facilitating a hand-in of user equipment to a femto cell is provided. As illustrated, process 1100 includes a series of acts that may be performed by an assignment unit (e.g., femto cell gateway 440 and/or management device 422) according to an aspect of the subject specification. For instance, process 1100 may be implemented by employing a processor to execute computer executable instructions stored on a computer readable storage medium to implement the series of acts. In another embodiment, a computer-readable storage medium comprising code for causing at least one computer to implement the acts of process 1100 are contemplated.

In an aspect, process 1100 begins with the assignment unit identifying a femto cell at act 1105, followed by an identification of a macro cell associated with the femto cell at act 1110. Process 1100 then proceeds with a primary scrambling code being ascertained for the femto cell at act 1115, followed by a timing offset being ascertained for the femto cell at act 1120. Here, for some embodiments, it should be appreciated that the primary scrambling code and/or the timing offset may be selectable by the femto cell.

Once the primary scrambling code and the timing offset have been ascertained, process 1100 proceeds to act 1125 where a unique identifier for the femto cell is derived. In an embodiment, the unique identifier is a function of the primary scrambling code and the timing offset. For instance, in a particular embodiment, the unique identifier is computed by taking the cross product of the primary scrambling code and the timing offset. Once the unique identifier is derived, process 1100 concludes at act 1130 with the assignment unit communicating an assignment identifying an exclusive relationship between the unique identifier and the femto cell.

Figure 12:
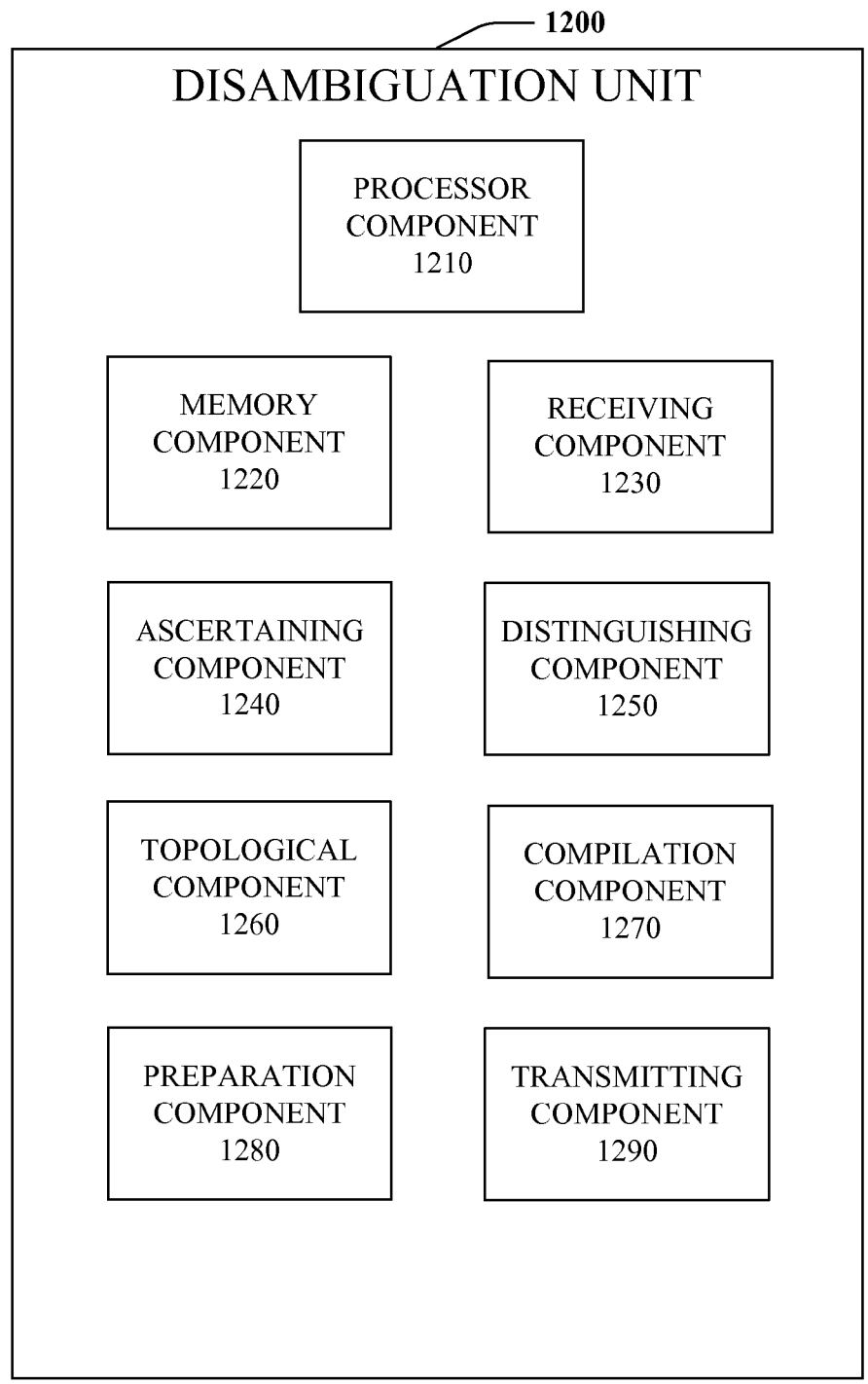
FIG. 12 illustrates a block diagram of an exemplary disambiguation unit that facilitates a disambiguation of femto cells in accordance with an aspect of the subject specification.

Referring next to FIG. 12, a block diagram illustrates an exemplary disambiguation unit in accordance with various aspects. As illustrated, disambiguation unit 1200 may include processor component 1210, memory component 1220, receiving component 1230, ascertaining component 1240, distinguishing component 1250, topological component 1260, compilation component 1270, preparation component 1280, and transmitting component 1290.

Similar to processor component 910 in assignment unit 900, processor component 1210 is configured to execute computer-readable instructions related to performing any of a plurality of functions. Processor component 1210 can be a single processor or a plurality of processors dedicated to analyzing information to be communicated from disambiguation unit 1200 and/or generating information that can be utilized by memory component 1220, receiving component 1230, ascertaining component 1240, distinguishing component 1250, topological component 1260, compilation component 1270, preparation component 1280, and/or transmitting component 1290. Additionally or alternatively, processor component 1210 may be configured to control one or more components of disambiguation unit 1200.

In another aspect, memory component 1220 is coupled to processor component 1210 and configured to store computer-readable instructions executed by processor component 1210. Memory component 1220 may also be configured to store any of a plurality of other types of data including data generated by any of receiving component 1230, ascertaining component 1240, distinguishing component 1250, topological component 1260, compilation component 1270, preparation component 1280, and/or transmitting component 1290. Here, it should be noted that memory component 1220 is analogous to memory component 920 in assignment unit 900. Accordingly, it should be appreciated that any of the aforementioned features/configurations of memory component 920 are also applicable to memory component 1220.

In yet another aspect, receiving component 1230 and transmitting component 1290 are also coupled to processor component 1210 and configured to interface disambiguation unit 1200 with external entities.

For instance, receiving component 1230 may be configured to receive a report associated with a target femto cell. Here, it should be appreciated that the received report may include any of a plurality of attributes related to a signal broadcast by the target femto cell. In another aspect, receiving component 1230 is configured to receive a plurality of assignments, wherein each of the plurality of assignments exclusively pairs a femto cell with a corresponding unique identifier. For this particular embodiment, the assignments may be received from assignment unit 900, for instance.

In another embodiment, transmitting component 1290 is utilized by disambiguation unit 1200 to provide instructions to the reporting user equipment. For instance, transmitting component 1290 may be configured to provide instructions to initialize a user equipment, including initializing the user equipment to provide a primary scrambling code associated with the target femto cell, as desired. For example, in one embodiment, the user equipment may be initialized to automatically provide the primary scrambling code upon a detection of the target femto cell. In another embodiment, however, the user equipment may be initialized to provide the primary scrambling code only upon receiving a request.

As illustrated, disambiguation unit 1200 further includes ascertaining component 1240. Within such embodiment, ascertaining component 1240 is configured to ascertain an identifier associated with the target femto cell. For this embodiment, the identifier is ascertained from at least one attribute included in the report received via receiving component 1230. In a further embodiment, ascertaining component 1240 is configured to utilize the report to find each of a scrambling parameter and a timing parameter. Within such embodiment, ascertaining component 1240 then ascertains the identifier based on the scrambling parameter and the timing parameter.

Here, it should be noted that the timing parameter used by ascertaining component 1240 may be ascertained using relative information between nodes. For instance, topological component 1260 may be configured to maintain a topological representation of a plurality of nodes, wherein the topological representation includes relative information between the nodes (e.g., a time drift associated with the nodes relative to each other).

In another aspect, disambiguation unit 1200 includes distinguishing component 1250. Within such embodiment, distinguishing component 1250 is configured to distinguish the target femto cell from at least one other femto cell based on the identifier. Here, it should be appreciated that distinguishing component 1250 may be configured to perform this distinction in any of a plurality of ways. For instance, in circumstances where receiving component 1230 receives the aforementioned assignments exclusively pairing a femto cell with a corresponding unique identifier, distinguishing component 1250 may be configured to associate the identifier ascertained by ascertaining component 1240 with a matching unique identifier. Distinguishing component 1250 may also be configured to distinguish the target femto cell based on other parameters, such as a global identifier associated with a source cell or a set of radio environment measurements associated with the target femto cell.

In other embodiments, distinguishing component 1250 may operate in conjunction with compilation component 1270. For instance, in an aspect, compilation component 1270 is configured to compile a list of candidate femto cells and to rank the list of candidate femto cells according to a likelihood of being the target femto cell. Within such embodiment, the ranking can be based on any of a plurality of parameters including, for example, a received user equipment power at the candidate femto cells or any of the plurality of attributes included in the report. Distinguishing component 1250 may then be configured to test the list of candidate femto cells in an order consistent with the ranking. Here, it should be noted that distinguishing component 1250 may be configured to test the list of candidate femto cells either individually or in groups.

Compilation component 1270 may also be configured to work with preparation component 1280. For instance, in an aspect, compilation component 1270 is configured to identify a set of femto cells accessible by a user equipment (i.e., the user equipment that generated the report received via receiving component 1230). Within such embodiment, preparation component 1280 is configured to perform a relocation preparation, wherein the relocation preparation includes only preparing the set of femto cells accessible by the user equipment.

Figure 13:
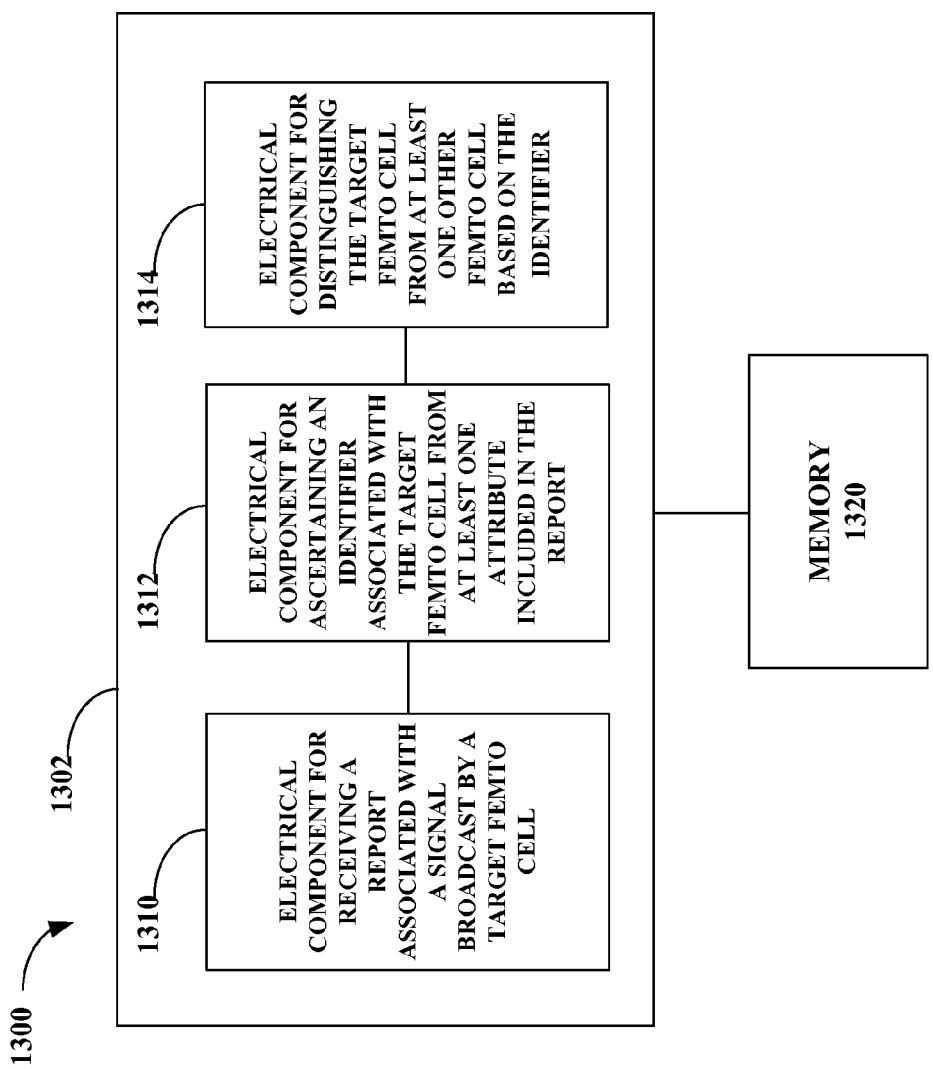
FIG. 13 is an illustration of an exemplary coupling of electrical components that effectuate disambiguating femto cells.

Compilation component 1270 may also implement any of various methods for reducing the list of candidate femto cells. For instance, compilation component 1270 may be configured to reduce the list of candidate femto cells according to any of a plurality of factors including, for example, measurements included in a relocation message and/or an uplink synchronization attempt performed on the candidate femto cells. Other parameters compilation component 1270 can utilize to compile the list of candidate femto cells may include a vicinity measurement associated with each of the candidate femto cells and/or a user equipment measurement received from at least one external node. The efficacy of the list of candidate femto cells may also be controlled by manipulating a threshold associated with detecting the candidate femto cells and/or maintaining a history of handover attempts associated with each of the candidate femto cells Referring next to FIG. 13, illustrated is a system 1300 that facilitates a disambiguation of femto cells according to an embodiment. System 1300 and/or instructions for implementing system 1300 can physically reside within disambiguation unit 1200 (e.g., femto cell gateway 440 and/or radio network controller 414) or a computer-readable storage medium, for instance, wherein system 1300 includes functional blocks that can represent functions implemented by a processor, software, or combination thereof (e.g., firmware). Moreover, system 1300 includes a logical grouping 1302 of electrical components that can act in conjunction similar to logical grouping 1002 in system 1000. As illustrated, logical grouping 1302 can include an electrical component for receiving a report associated with a signal broadcast by a target femto cell 1310. Furthermore, logical grouping 1302 can include an electrical component for ascertaining an identifier associated with the target femto cell from at least one attribute included in the report 1312. Logical grouping 1302 can also include an electrical component for distinguishing the target femto cell from at least one other femto cell based on the identifier 1314. Additionally, system 1300 can include a memory 1320 that retains instructions for executing functions associated with electrical components 1310, 1312, and 1314. While shown as being external to memory 1320, it is to be understood that electrical components 1310, 1312, and 1314 can exist within memory 1320.

Figure 14:
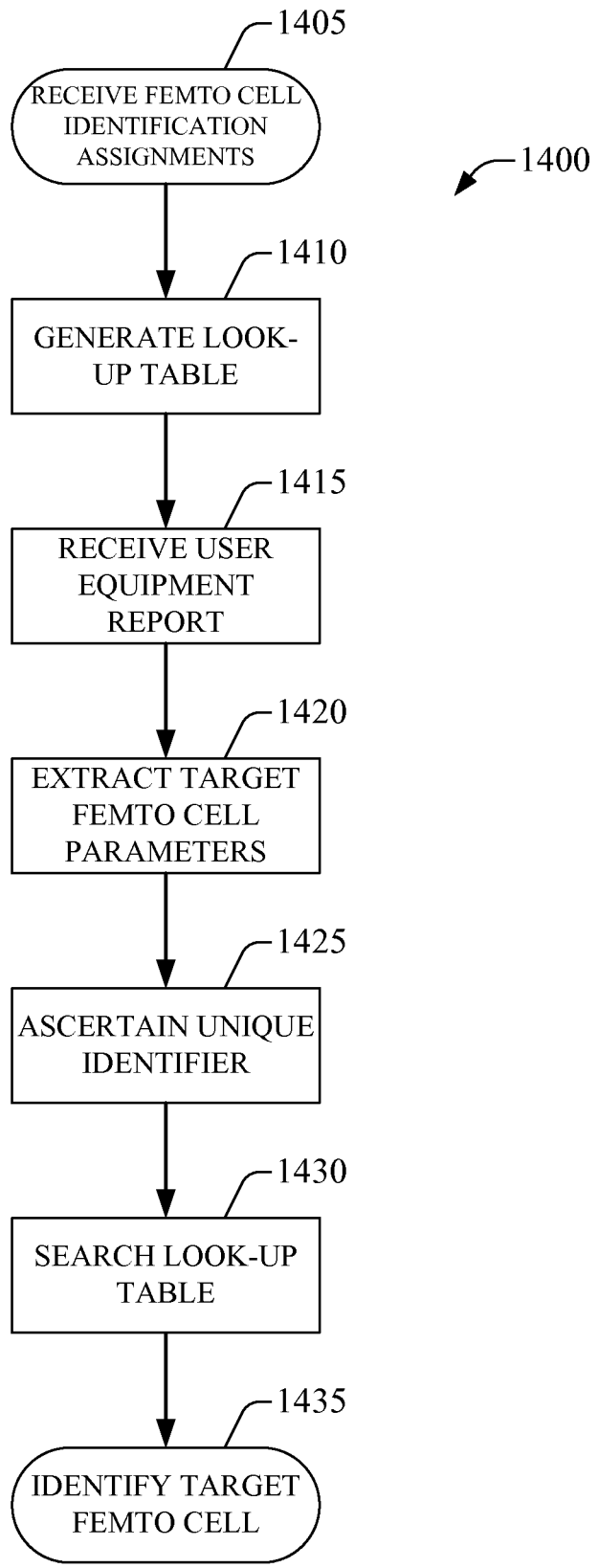
FIG. 14 is a flow chart illustrating a first exemplary methodology that facilitates a disambiguation of femto cells in accordance with a first aspect of the subject specification.

Referring next to FIG. 14, a flow chart illustrating an exemplary method for facilitating a disambiguation of femto cells is provided. As illustrated, process 1400 includes a series of acts that may be performed by a disambiguation unit according to an aspect of the subject specification. For instance, process 1400 may be implemented by employing a processor to execute computer executable instructions stored on a computer readable storage medium to implement the series of acts. In another embodiment, a computer-readable storage medium comprising code for causing at least one computer to implement the acts of process 1400 are contemplated.

In an aspect, process 1400 begins with the disambiguation unit receiving femto cell identification assignments at act 1405. For this particular embodiment, each of the received assignments exclusively pairs a femto cell with a corresponding unique identifier. Moreover, for this embodiment, each of the unique identifiers is a function of a primary scrambling code and a timing offset associated with the femto cell.

Next, at act 1410, process 1400 proceeds with the generation of a look-up table for readily identifying femto cells according to their corresponding unique identifier. Within such embodiment, the look-up table is populated by the received femto cell identification assignments.

A user equipment report is then received at act 1415, followed by an extraction of target cell parameters from the report at act 1420. For this embodiment, the parameters extracted from the report include a particular timing offset assigned to the femto cell and/or particular scrambling codes associated with the femto cell. Upon extracting the target cell parameters, process 1400 ascertains a unique identifier based on the extracted parameters at act 1425. For instance, as stated previously, the unique identifier may be the unique cross product of the assigned timing offset and the primary scrambling code associated with the femto cell. Once the unique identifier for the detected femto cell has been computed, process 1400 proceeds with a search of the look-up table at act 1430 for a matching unique identifier entry. Process 1400 then concludes at act 1435 where the target femto cell is identified.

Figure 15:
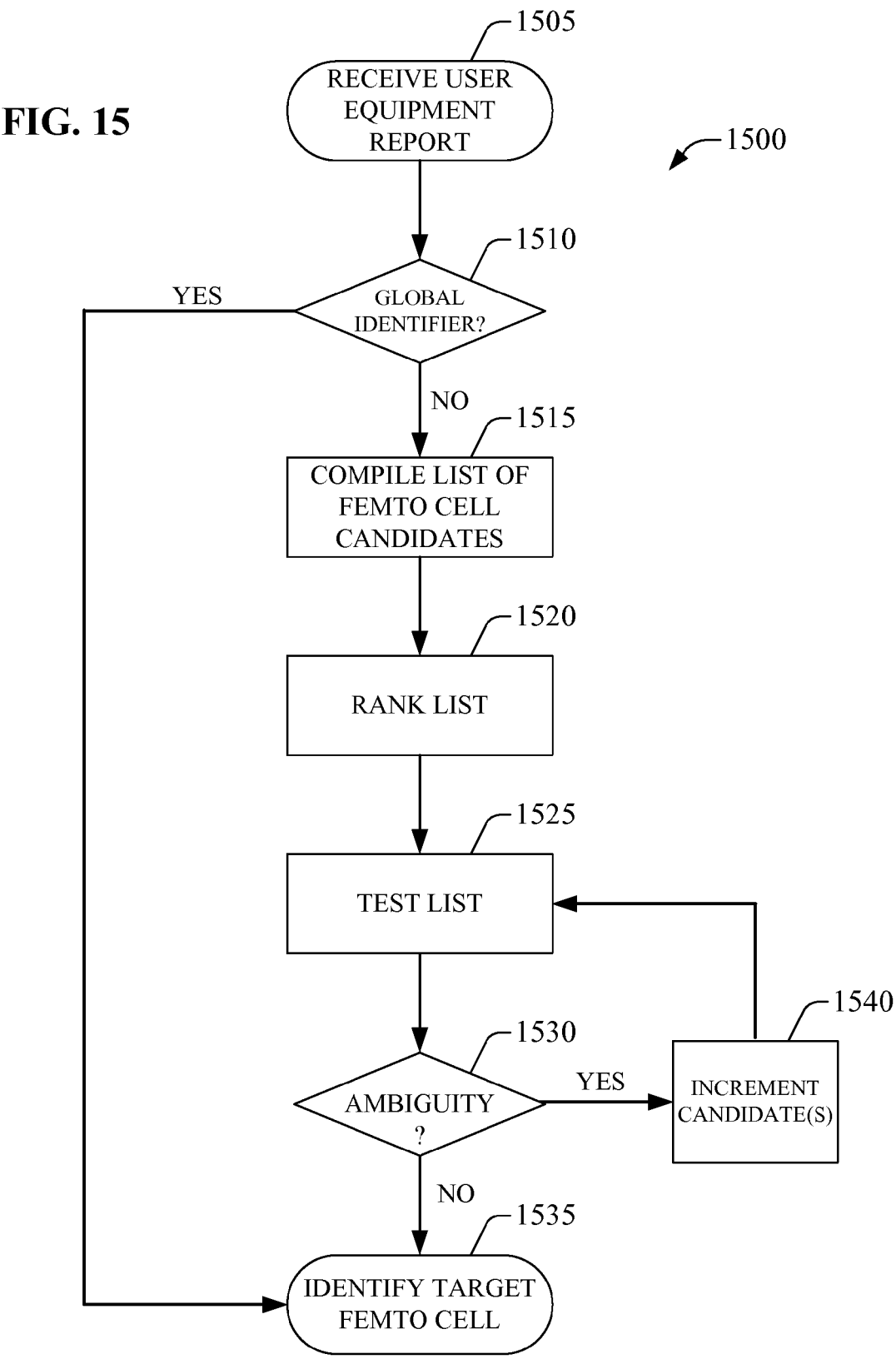
FIG. 15 is a flow chart illustrating a second exemplary methodology that facilitates a disambiguation of femto cells in accordance with an aspect of the subject specification.

Referring next to FIG. 15, a flow chart illustrating another exemplary method for facilitating a disambiguation of femto cells is provided. As illustrated, process 1500 also includes a series of acts that may be performed by a disambiguation unit. For instance, process 1500 may again be implemented by employing a processor to execute computer executable instructions stored on a computer readable storage medium to implement the series of acts. In another embodiment, a computer-readable storage medium comprising code for causing at least one computer to implement the acts of process 1500 are contemplated.

In an aspect, process 1500 begins with the disambiguation unit receiving a user equipment report at act 1505. Here, it should be appreciated that different types of user equipment may have different capabilities (e.g., Release 9+ user equipment have different capabilities than pre-Release 9 user equipment). For instance, some user equipment can be configured to provide a global cell identifier associated with a target femto cell, whereas other user equipment cannot. Accordingly, at act 1510, process 1500 determines whether the received user equipment report includes a global cell identifier for the target femto cell. If a global cell identifier was indeed included, process 1500 concludes at act 1535 where the target femto cell is readily identified. Otherwise, if no global cell identifier is included, process 1500 proceeds to act 1515.

At act 1515, a list of candidate femto cells is compiled to facilitate identifying the target femto cell. Here, it should be noted that the list of candidate femto cells may be evaluated according to any of a plurality of factors including, for example, vicinity measurements to the user equipment (e.g., based on a received user equipment power), a history of previous hand-in attempts, etc. For this particular embodiment, the candidate femto cells are ranked at act 1520 according to their likelihood of being the target femto cell, and subsequently tested at act 1525. In an aspect, the testing of the candidate femto cells is performed in an order consistent with their particular ranking (e.g, most likely to less likely), wherein the candidate femto cells can be tested either individually or in groups.

Next, at act 1530, process 1500 determines whether an ambiguity exists, which precludes the target femto cell from being identified. If no ambiguity exists, process 1500 concludes at act 1535 where the target femto cell is readily identified. Otherwise, if an ambiguity does indeed exist, a counter is incremented at act 1540, followed by process 1500 looping back to act 1525 where subsequent candidates are tested.

Figure 16:
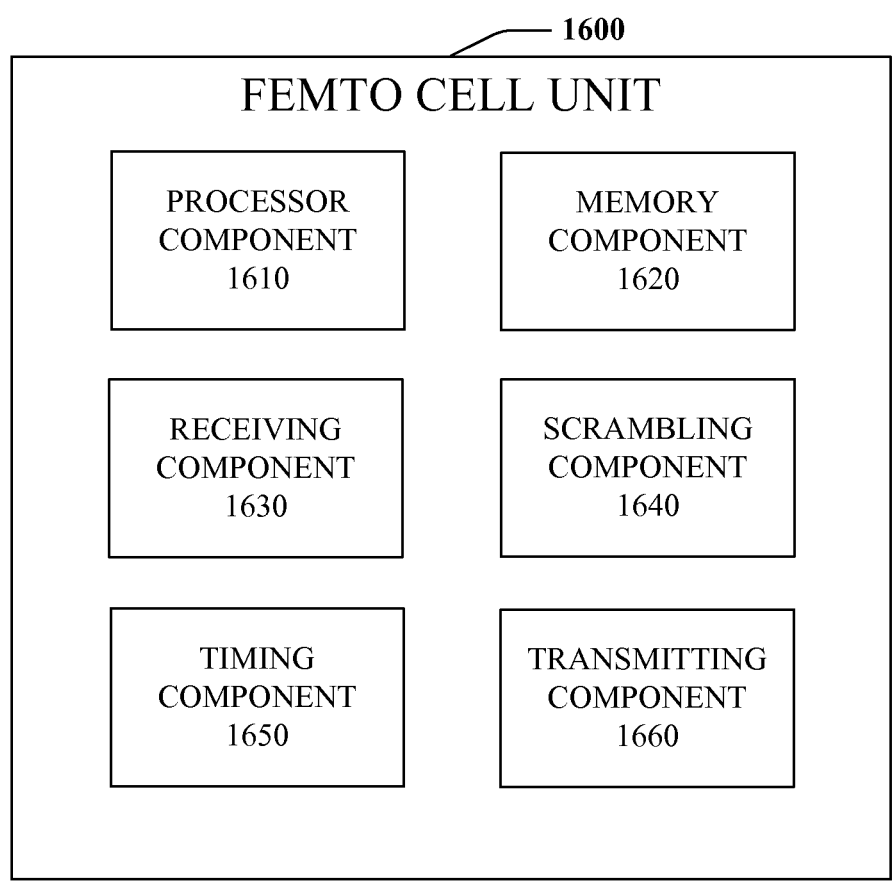
FIG. 16 illustrates a block diagram of an exemplary femto cell unit that facilitates identifying a femto cell in accordance with an aspect of the subject specification.

Referring next to FIG. 16, a block diagram illustrates an exemplary femto cell unit in accordance with various aspects. As illustrated, femto cell unit 1600 may include processor component 1610, memory component 1620, receiving component 1630, scrambling component 1640, timing component 1650, and transmitting component 1660.

Similar to processor components 910 and 1210 in assignment unit 900 and disambiguation unit 1200, respectively, processor component 1610 is configured to execute computer-readable instructions related to performing any of a plurality of functions. Processor component 1610 can be a single processor or a plurality of processors dedicated to analyzing information to be communicated from femto cell unit 1600 and/or generating information that can be utilized by memory component 1620, receiving component 1630, scrambling component 1640, timing component 1650, and/or transmitting component 1660. Additionally or alternatively, processor component 1610 may be configured to control one or more components of femto cell unit 1600.

In another aspect, memory component 1620 is coupled to processor component 1610 and configured to store computer-readable instructions executed by processor component 1610. Memory component 1620 may also be configured to store any of a plurality of other types of data including data generated by any of receiving component 1630, scrambling component 1640, timing component 1650, and/or transmitting component 1660. Here, it should be noted that memory component 1620 is analogous to memory components 920 and 1220 in assignment unit 900 and disambiguation unit 1200, respectively. Accordingly, it should be appreciated that any of the aforementioned features/configurations of memory component 920 and/or 1220 are also applicable to memory component 1620.

In yet another aspect, receiving component 1630 and transmitting component 1660 are also coupled to processor component 1610 and configured to interface femto cell unit 1600 with external entities. For instance, receiving component 1630 may be configured to receive a communication that includes a timing parameter (e.g., a communication from management device 422 that includes a macro node frame number), whereas transmitting component 1660 may be configured to broadcast a signal from femto cell unit 1600. Here, it should be noted that transmitting component 1660 may also be configured to communicate particular attributes to an external entity including for example, a scrambling parameter associated with femto cell unit 1600, an offset related to the timing parameter, a radio environment measurement, and/or a received user equipment power.

In an aspect, the signal broadcast from femto cell unit 1600 includes a scrambling parameter and is broadcast according to an offset. To facilitate this broadcast, femto cell unit may utilize scrambling component 1640 and timing component 1650. Within such embodiment, scrambling component 1640 is configured to set a scrambling parameter (e.g., a primary scrambling code), whereas timing component 1650 is configured to ascertain an offset related to the timing parameter (wherein timing component 1650 may be configured to select the offset and/or extrapolate the offset from the communication received via receiving component 1630).

Figure 17:
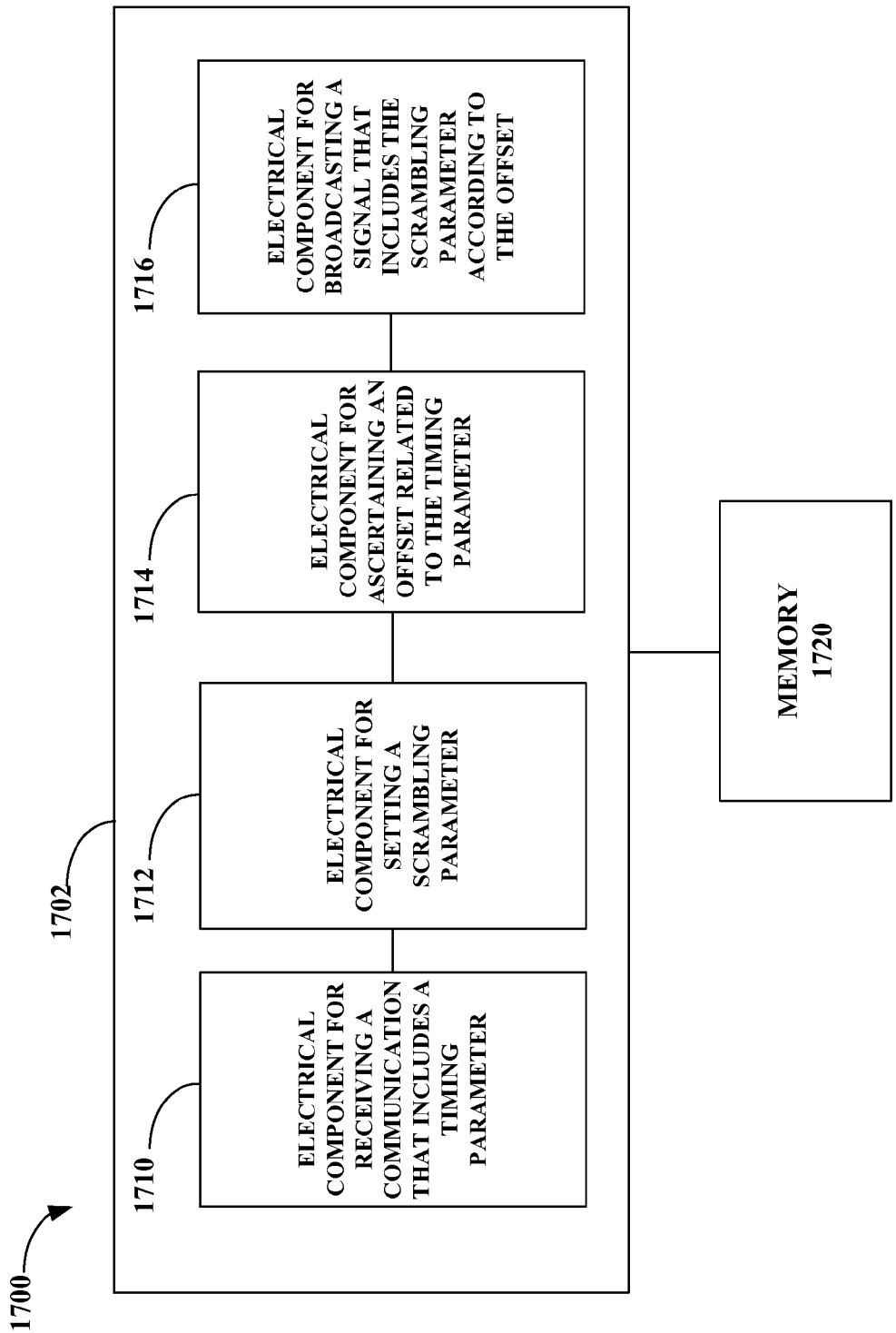
FIG. 17 is an illustration of an exemplary coupling of electrical components that effectuate facilitating identifying a femto cell.

Referring next to FIG. 17, illustrated is a system 1700 that facilitates identifying a femto cell. System 1700 and/or instructions for implementing system 1700 can physically reside within a femto cell unit 1600 or a computer-readable storage medium, for instance, wherein system 1700 includes functional blocks that can represent functions implemented by a processor, software, or combination thereof (e.g., firmware). Moreover, system 1700 includes a logical grouping 1702 of electrical components that can act in conjunction similar to logical groupings 1002 and 1302 in systems 1000 and 1300, respectively. As illustrated, logical grouping 1702 can include an electrical component for receiving a communication that includes a timing parameter 1710, as well as an electrical component for setting a scrambling parameter 1712. Logical grouping 1702 can also include an electrical component for ascertaining an offset related to the timing parameter 1714. Further, logical grouping 1702 can include an electrical component for broadcasting a signal that includes the scrambling parameter according to the offset 1716. Additionally, system 1700 can include a memory 1720 that retains instructions for executing functions associated with electrical components 1710, 1712, 1714, and 1716, wherein any of electrical components 1710, 1712, 1714, and 1716 can exist either within or outside memory 1720.

Figure 18:
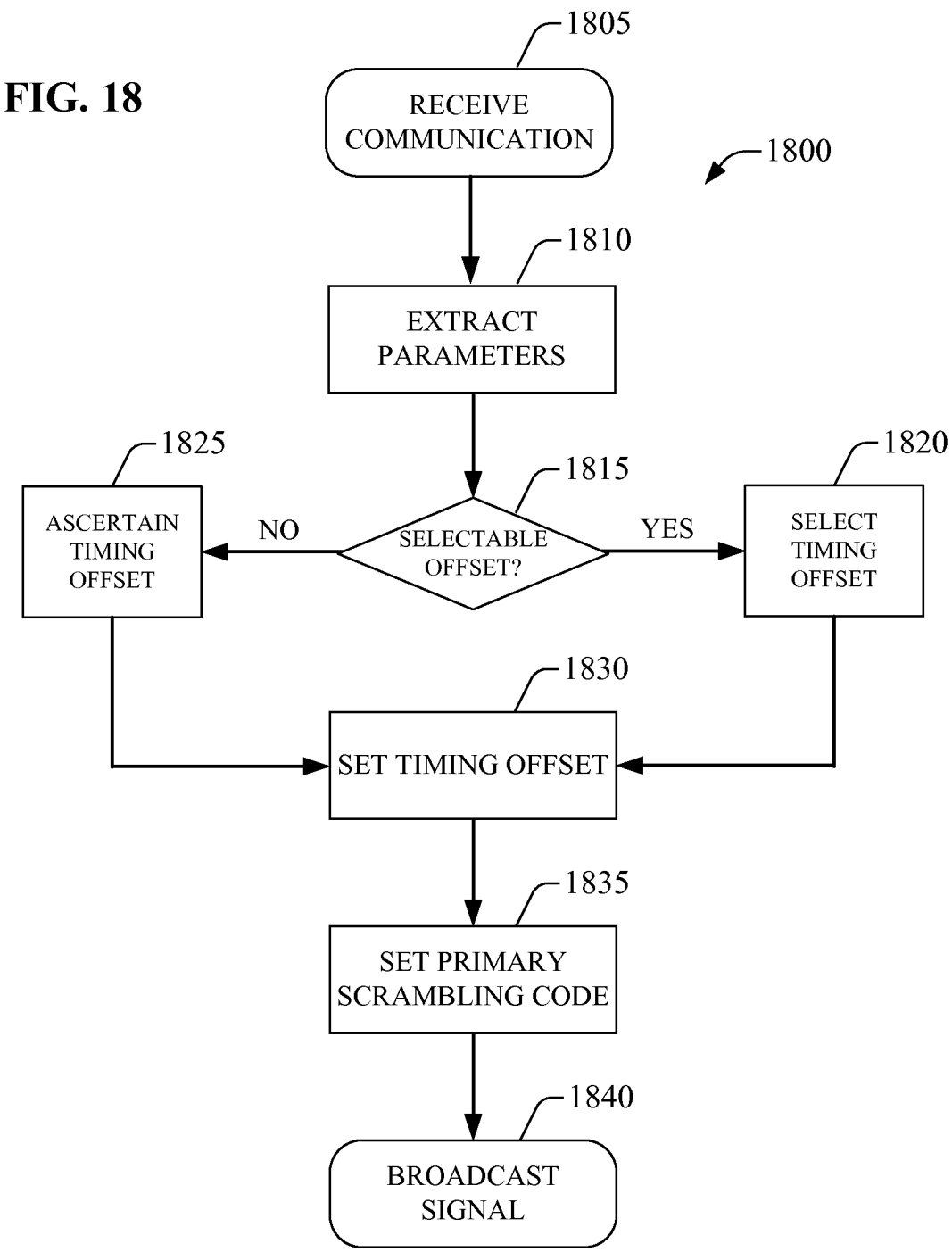
FIG. 18 is a flow chart illustrating an exemplary methodology for facilitating identifying a femto cell in accordance with an aspect of the subject specification.

Referring next to FIG. 18, a flow chart illustrating an exemplary method that facilitates identifying a femto cell is provided. As illustrated, process 1800 includes a series of acts that may be performed by a femto cell according to an aspect of the subject specification. For instance, process 1800 may be implemented by employing a processor to execute computer executable instructions stored on a computer readable storage medium to implement the series of acts. In another embodiment, a computer-readable storage medium comprising code for causing at least one computer to implement the acts of process 1800 are contemplated.

In an aspect, process 1800 begins at act 1805 where a communication is received, and where parameters corresponding to the femto cell are subsequently extracted from the communication at act 1810. For this particular embodiment, the extracted parameters may include a scrambling parameter and/or a timing parameter. In an aspect, the scrambling parameter is a primary scrambling code included in the communication, whereas the timing parameter is a parameter used to ascertain a timing offset (relative to a macro cell having a coverage area encompassing the femto cell) which the femto cell will utilize to broadcast a signal.

For some embodiments, it should be noted that the timing offset may be selectable by the femto cell. Accordingly, at act 1815, process 1800 determines whether the offset is selectable. For instance, in one embodiment, the timing offset is explicitly included in the initial communication, whereas in another embodiment, a frame number of the macro cell is provided which the femto cell utilizes to select the timing offset. Moreover, if the timing offset is explicitly provided, process 1800 proceeds to act 1825 where the timing offset is ascertained. Otherwise, the timing offset is selected by the femto cell at act 1820.

Once the timing offset has been either ascertained or selected, process 1800 proceeds to act 1830 where the timing offset is set. The primary scrambling code is then set at act 1835. Process 1800 then concludes at act 1840 where a signal that includes the primary scrambling code is broadcast by the femto cell according to the timing offset.

Figure 19:
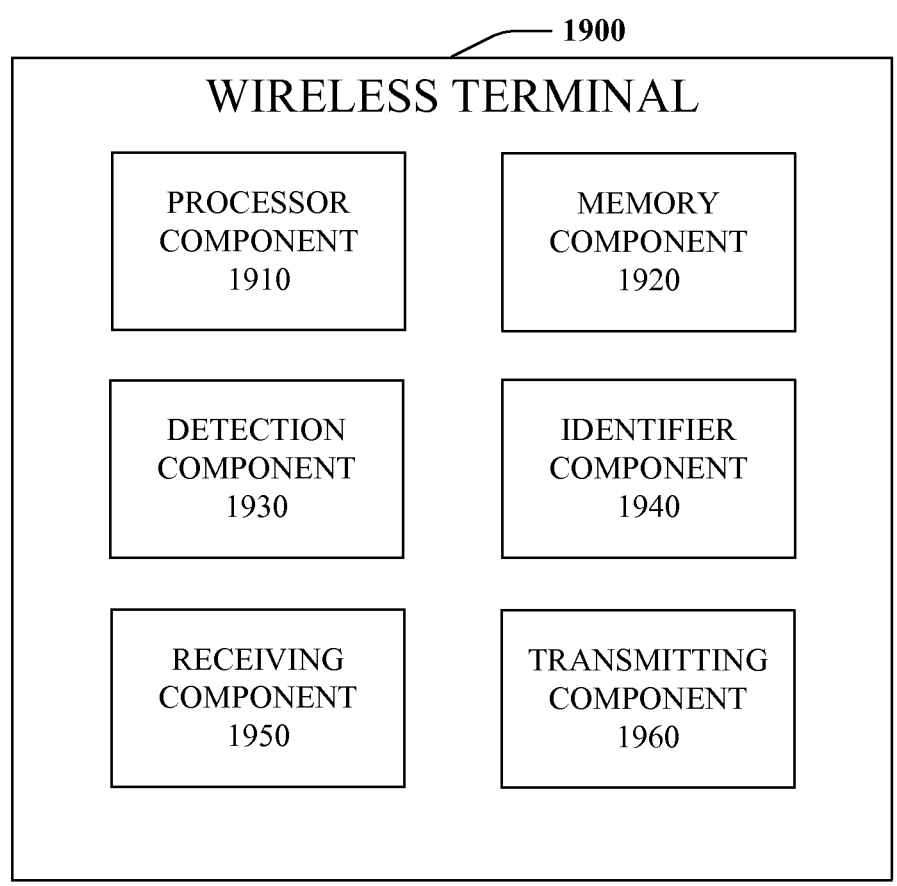
FIG. 19 illustrates a block diagram of an exemplary wireless terminal that facilitates performing a hand-in to a femto cell in accordance with an aspect of the subject specification.

Referring next to FIG. 19, a block diagram illustrates an exemplary wireless terminal in accordance with various aspects. As illustrated, wireless terminal 1900 may include processor component 1910, memory component 1920, detection component 1930, identifier component 1940, receiving component 1950, and transmitting component 1960.

Similar to processor components 910, 1210, and 1610 in assignment unit 900, disambiguation unit 1200, and femto cell unit 1600, respectively, processor component 1910 is configured to execute computer-readable instructions related to performing any of a plurality of functions. Processor component 1910 can be a single processor or a plurality of processors dedicated to analyzing information to be communicated from wireless terminal 1900 and/or generating information that can be utilized by memory component 1920, detection component 1930, identifier component 1940, receiving component 1950, and/or transmitting component 1960. Additionally or alternatively, processor component 1910 may be configured to control one or more components of wireless terminal 1900.

In another aspect, memory component 1920 is coupled to processor component 1910 and configured to store computer-readable instructions executed by processor component 1910. Memory component 1920 may also be configured to store any of a plurality of other types of data including data generated by any of detection component 1930, identifier component 1940, receiving component 1950, and/or transmitting component 1960. Here, it should be noted that memory component 1920 is analogous to memory components 920, 1220, and 1620 in assignment unit 900, disambiguation unit 1200, and femto cell unit 1600, respectively. Accordingly, it should be appreciated that any of the aforementioned features/configurations of memory component 920, 1220, and/or 1620 are also applicable to memory component 1920.

As illustrated, wireless terminal 1900 may further include detection component 1930 and identifier component 1940. Within such embodiment, detection component 1930 is configured to detect a target femto cell during an active call, whereas identifier component 1940 is configured to ascertain a global identifier associated with the target femto cell. Here, it should be noted that identifier component 1940 may be configured to determine the global identifier in response to a request (e.g., a request from radio network controller 414) and/or identifier component 1940 may be configured to automatically determine the global identifier upon a detection of a detected femto cell.

In yet another aspect, transmitting component 1960 and receiving component 1950 are also coupled to processor component 1910 and configured to interface wireless terminal 1900 with external entities. For instance, transmitting component 1960 may be configured to report the global identifier to an external entity (e.g., to radio network controller 414), whereas receiving component 1950 may be configured to receive a request to provide the global identifier (e.g., a request for the global identifier from radio network controller 414).

Figure 20:
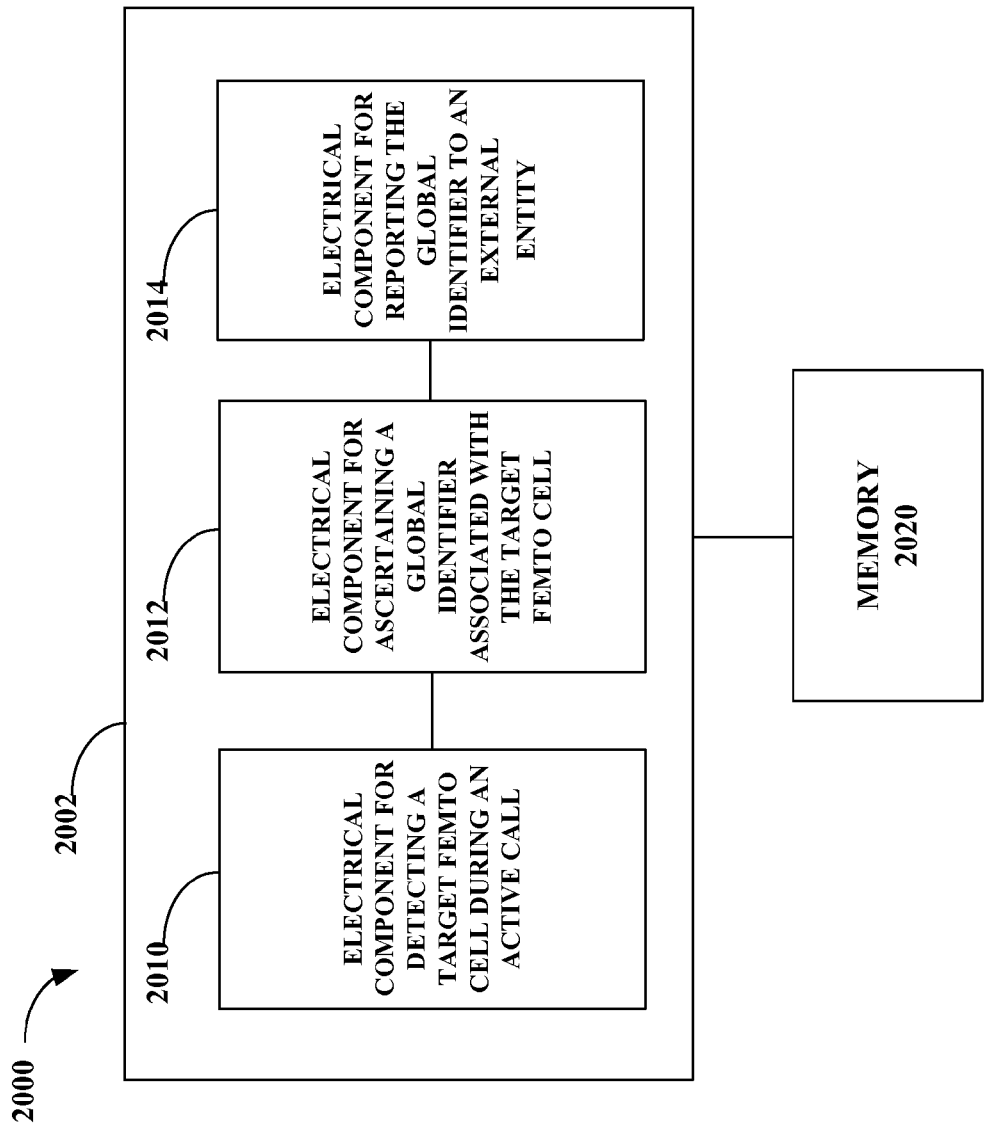
FIG. 20 is an illustration of an exemplary coupling of electrical components that effectuate facilitating performing a hand-in to a femto cell.

Referring next to FIG. 20, illustrated is a system 2000 that facilitates performing a hand-in to a femto cell according to an embodiment. System 2000 and/or instructions for implementing system 2000 can physically reside within wireless terminal 1900 or a computer-readable storage medium, for instance, wherein system 2000 includes functional blocks that can represent functions implemented by a processor, software, or combination thereof (e.g., firmware). Moreover, system 2000 includes a logical grouping 2002 of electrical components that can act in conjunction similar to logical groupings 1002, 1302, and 1702 in systems 1000, 1300, and 1700, respectively. As illustrated, logical grouping 2002 can include an electrical component for detecting a target femto cell during an active call 2010. Furthermore, logical grouping 2002 can include an electrical component for ascertaining a global identifier associated with the target femto cell 2012. Logical grouping 2002 can also include an electrical component for reporting the global identifier to an external entity 2014. Additionally, system 2000 can include a memory 2020 that retains instructions for executing functions associated with electrical components 2010, 2012, and 2014. While shown as being external to memory 2020, it is to be understood that electrical components 2010, 2012, and 2014 can exist within memory 2020.

Figure 21:
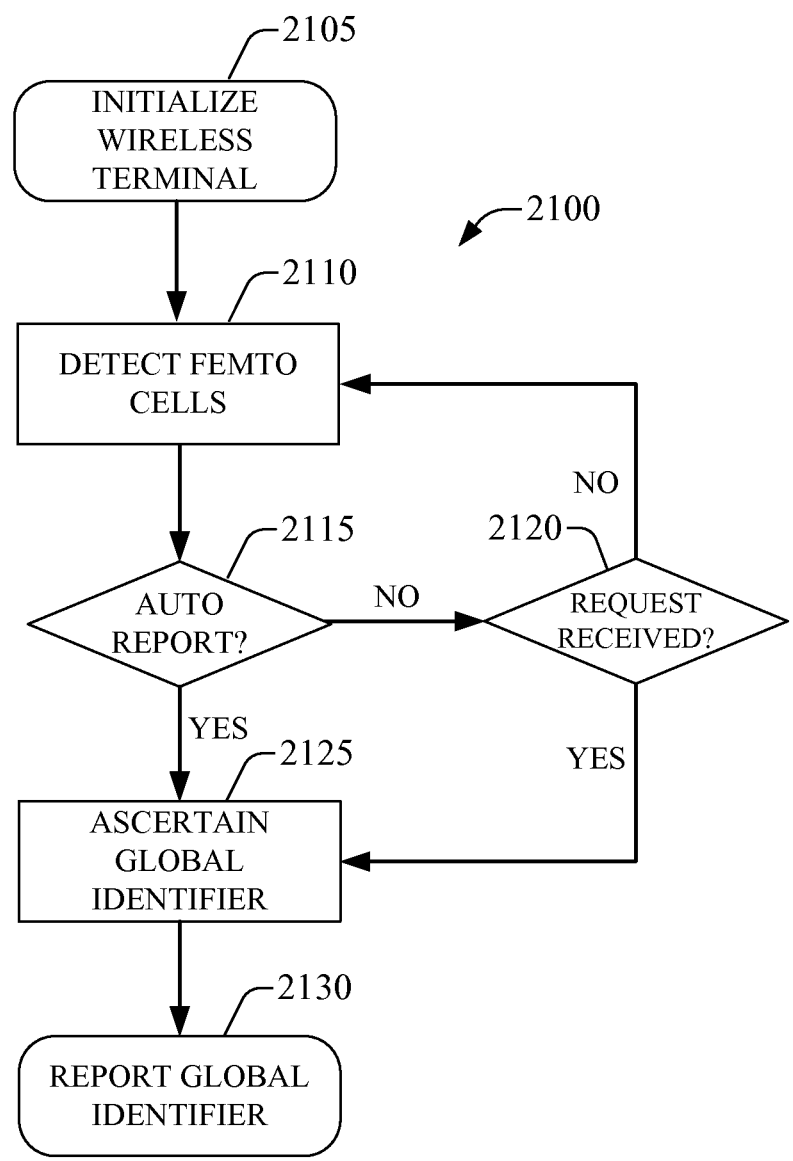
FIG. 21 is a flow chart illustrating an exemplary methodology for facilitating performing a hand-in to a femto cell in accordance with an aspect of the subject specification.

Referring next to FIG. 21, a flow chart illustrating an exemplary method for facilitating performing a hand-in to a femto cell is provided. As illustrated, process 2100 includes a series of acts that may be performed by a wireless terminal according to an aspect of the subject specification. For instance, process 2100 may be implemented by employing a processor to execute computer executable instructions stored on a computer readable storage medium to implement the series of acts. In another embodiment, a computer-readable storage medium comprising code for causing at least one computer to implement the acts of process 2100 are contemplated.

In an aspect, process 2100 begins at act 2105 where the wireless terminal is initialized. Within such embodiment, the wireless terminal may be initialized to perform in any of a plurality of ways. For instance, with respect to reporting a global identifier corresponding to a detected femto cell, the wireless terminal may be initialized to either automatically report the global cell identifier, or to only report global cell identifiers upon request.

After the wireless terminal is initialized, process 2100 proceeds with the detection of femto cells at act 2110, followed by a determination at act 2115 of whether to automatically report the detected femto cell's global cell identifier. If the wireless terminal was initialized to automatically report global cell identifiers, the global cell identifier for the detected cell is ascertained at act 2125, wherein process 2100 subsequently concludes with the global cell identifier being reported at act 2130. Otherwise, if the wireless terminal is configured to only report global cell identifiers upon request (i.e., the wireless terminal is not configured to automatically report), process 2100 proceeds to act 2120 where a determination is made as to whether a request for the global identifier has been received. If a request has indeed been received, the global cell identifier for the detected cell is ascertained at act 2125, wherein process 2100 subsequently concludes with the global cell identifier being reported at act 2130. Otherwise, if no request for the global cell identifier was made, process 2100 loops back to act 2110 where femto cells continue to be monitored.

Exemplary Communication System

Figure 22:
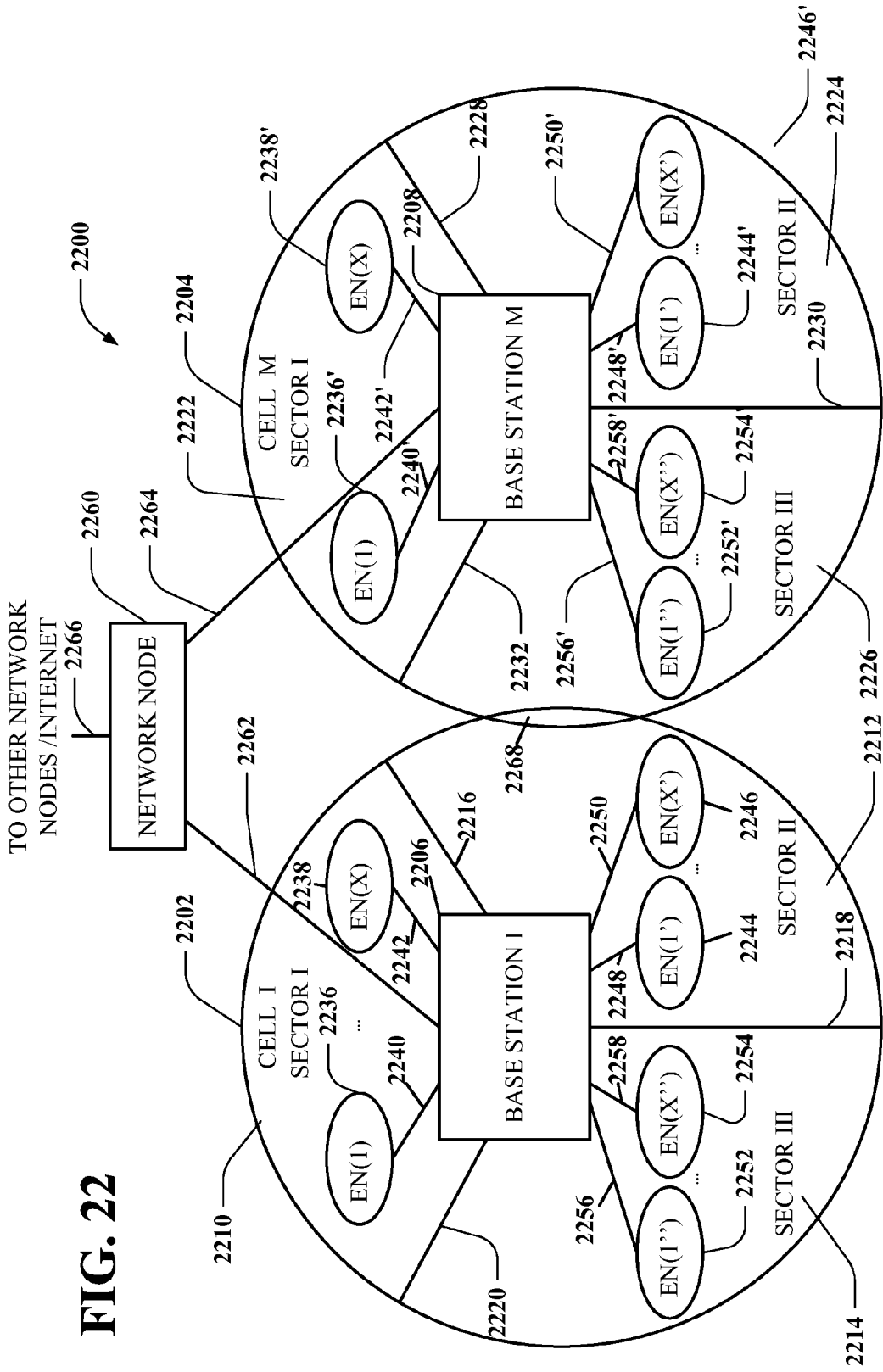
FIG. 22 is an illustration of an exemplary communication system implemented in accordance with various aspects including multiple cells.

Referring next to FIG. 22, an exemplary communication system 2200 implemented in accordance with various aspects is provided including multiple cells: cell 12202, cell M 2204. Here, it should be noted that neighboring cells 2202, 2204 overlap slightly, as indicated by cell boundary region 2268, thereby creating potential for signal interference between signals transmitted by base stations in neighboring cells. Each cell 2202, 2204 of system 2200 includes three sectors. Cells which have not been subdivided into multiple sectors (N=1), cells with two sectors (N=2) and cells with more than 3 sectors (N>3) are also possible in accordance with various aspects. Cell 2202 includes a first sector, sector I 2210, a second sector, sector II 2212, and a third sector, sector III 2214. Each sector 2210, 2212, and 2214 has two sector boundary regions; each boundary region is shared between two adjacent sectors.

Sector boundary regions provide potential for signal interference between signals transmitted by base stations in neighboring sectors. Line 2216 represents a sector boundary region between sector I 2210 and sector II 2212; line 2218 represents a sector boundary region between sector II 2212 and sector III 2214; line 2220 represents a sector boundary region between sector III 2214 and sector I 2210. Similarly, cell M 2204 includes a first sector, sector I 2222, a second sector, sector II 2224, and a third sector, sector III 2226. Line 2228 represents a sector boundary region between sector I 2222 and sector II 2224; line 2230 represents a sector boundary region between sector II 2224 and sector III 2226; line 2232 represents a boundary region between sector III 2226 and sector I 2222. Cell I 2202 includes a base station (BS), base station I 2206, and a plurality of end nodes (ENs) in each sector 2210, 2212, 2214. Sector I 2210 includes EN(1) 2236 and EN(X) 2238 coupled to BS 2206 via wireless links 2240, 2242, respectively; sector II 2212 includes EN(1') 2244 and EN(X') 2246 coupled to BS 2206 via wireless links 2248, 2250, respectively; sector III 2214 includes EN(1") 2252 and EN(X") 2254 coupled to BS 2206 via wireless links 2256, 2258, respectively. Similarly, cell M 2204 includes base station M 2208, and a plurality of end nodes (ENs) in each sector 2222, 2224, and 2226. Sector I 2222 includes EN(1) 2236' and EN(X) 2238' coupled to BS M 2208 via wireless links 2240', 2242', respectively; sector II 2224 includes EN(1') 2244' and EN(X') 2246' coupled to BS M 2208 via wireless links 2248', 2250', respectively; sector 3 2226 includes EN(1") 2252' and EN(X") 2254' coupled to BS 2208 via wireless links 2256', 2258', respectively.

System 2200 also includes a network node 2260 which is coupled to BS I 2206 and BS M 2208 via network links 2262, 2264, respectively. Network node 2260 is also coupled to other network nodes, e.g., other base stations, AAA server nodes, intermediate nodes, routers, etc. and the Internet via network link 2266. Network links 2262, 2264, 2266 may be, e.g., fiber optic cables. Each end node, e.g. EN 1 2236 may be a wireless terminal including a transmitter as well as a receiver. The wireless terminals, e.g., EN(1) 2236 may move through system 2200 and may communicate via wireless links with the base station in the cell in which the EN is currently located. The wireless terminals, (WTs), e.g. EN(1) 2236, may communicate with peer nodes, e.g., other WTs in system 2200 or outside system 2200 via a base station, e.g. BS 2206, and/or network node 2260. WTs, e.g., EN(1) 2236 may be mobile communications devices such as cell phones, personal data assistants with wireless modems, etc. Respective base stations perform tone subset allocation using a different method for the strip-symbol periods, from the method employed for allocating tones and determining tone hopping in the rest symbol periods, e.g., non strip-symbol periods. The wireless terminals use the tone subset allocation method along with information received from the base station, e.g., base station slope ID, sector ID information, to determine tones that they can employ to receive data and information at specific strip-symbol periods. The tone subset allocation sequence is constructed, in accordance with various aspects to spread inter-sector and inter-cell interference across respective tones. Although the subject system was described primarily within the context of cellular mode, it is to be appreciated that a plurality of modes may be available and employable in accordance with aspects described herein.

Exemplary Base Station

Figure 23:
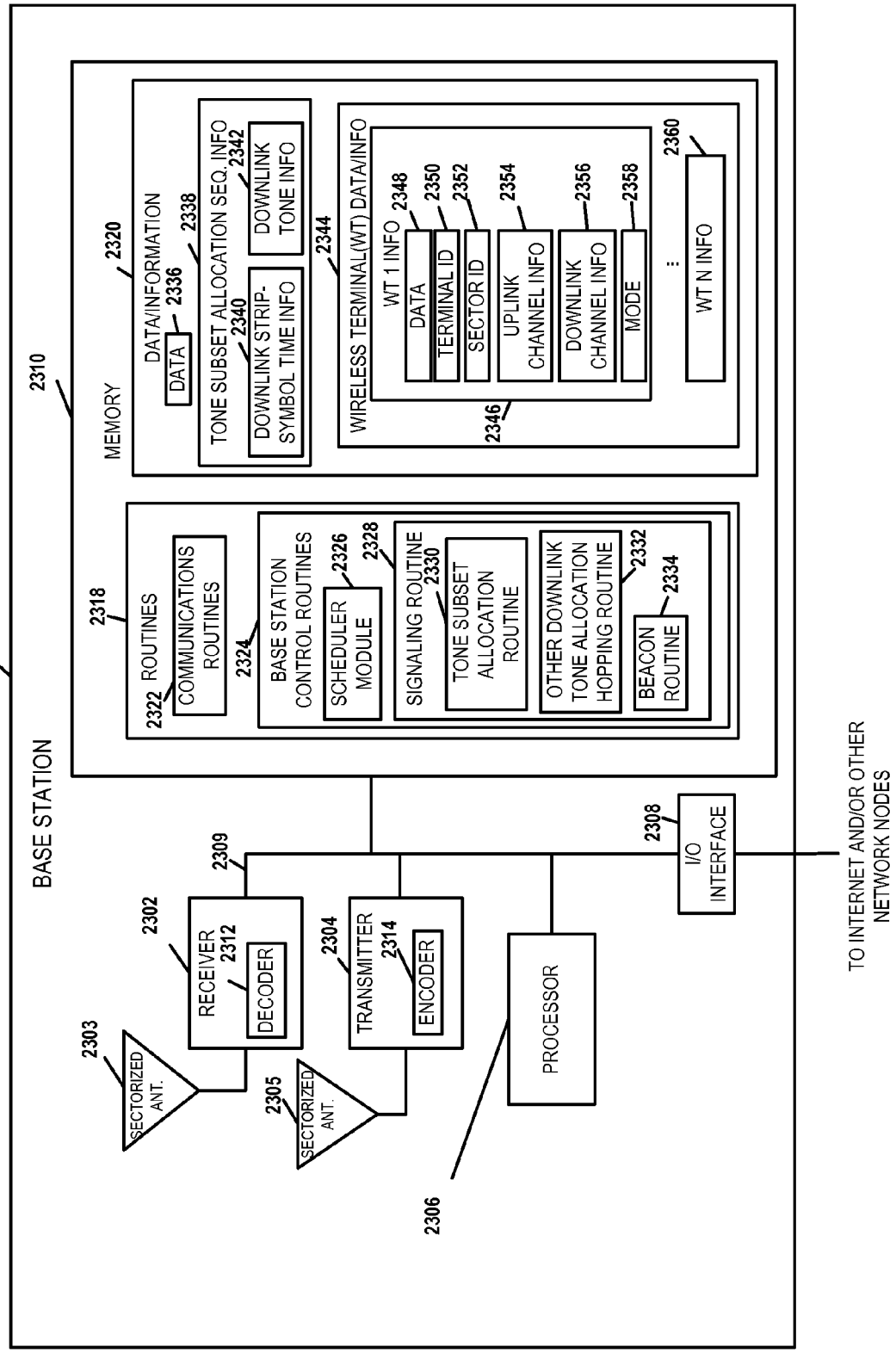
FIG. 23 is an illustration of an exemplary base station in accordance with various aspects described herein.

FIG. 23 illustrates an example base station 2300 in accordance with various aspects. Base station 2300 implements tone subset allocation sequences, with different tone subset allocation sequences generated for respective different sector types of the cell. Base station 2300 may be used as any one of base stations 2206, 2208 of the system 2200 of FIG. 22. The base station 2300 includes a receiver 2302, a transmitter 2304, a processor 2306, e.g., CPU, an input/output interface 2308 and memory 2310 coupled together by a bus 2309 over which various elements 2302, 2304, 2306, 2308, and 2310 may interchange data and information.

Sectorized antenna 2303 coupled to receiver 2302 is used for receiving data and other signals, e.g., channel reports, from wireless terminals transmissions from each sector within the base station's cell. Sectorized antenna 2305 coupled to transmitter 2304 is used for transmitting data and other signals, e.g., control signals, pilot signal, beacon signals, etc. to wireless terminals 2400 (see FIG. 24) within each sector of the base station's cell. In various aspects, base station 2300 may employ multiple receivers 2302 and multiple transmitters 2304, e.g., an individual receivers 2302 for each sector and an individual transmitter 2304 for each sector. Processor 2306, may be, e.g., a general purpose central processing unit (CPU). Processor 2306 controls operation of base station 2300 under direction of one or more routines 2318 stored in memory 2310 and implements the methods. I/O interface 2308 provides a connection to other network nodes, coupling the BS 2300 to other base stations, access routers, AAA server nodes, etc., other networks, and the Internet. Memory 2310 includes routines 2318 and data/information 2320.

Data/information 2320 includes data 2336, tone subset allocation sequence information 2338 including downlink strip-symbol time information 2340 and downlink tone information 2342, and wireless terminal (WT) data/info 2344 including a plurality of sets of WT information: WT 1 info 2346 and WT N info 2360. Each set of WT info, e.g., WT 1 info 2346 includes data 2348, terminal ID 2350, sector ID 2352, uplink channel information 2354, downlink channel information 2356, and mode information 2358.

Routines 2318 include communications routines 2322 and base station control routines 2324. Base station control routines 2324 includes a scheduler module 2326 and signaling routines 2328 including a tone subset allocation routine 2330 for strip-symbol periods, other downlink tone allocation hopping routine 2332 for the rest of symbol periods, e.g., non strip-symbol periods, and a beacon routine 2334.

Data 2336 includes data to be transmitted that will be sent to encoder 2314 of transmitter 2304 for encoding prior to transmission to WTs, and received data from WTs that has been processed through decoder 2312 of receiver 2302 following reception. Downlink strip-symbol time information 2340 includes the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone information 2342 includes information including a carrier frequency assigned to the base station 2300, the number and frequency of tones, and the set of tone subsets to be allocated to the strip-symbol periods, and other cell and sector specific values such as slope, slope index and sector type.

Data 2348 may include data that WT1 2400 has received from a peer node, data that WT 1 2400 desires to be transmitted to a peer node, and downlink channel quality report feedback information. Terminal ID 2350 is a base station 2300 assigned ID that identifies WT 1 2400. Sector ID 2352 includes information identifying the sector in which WT1 2400 is operating. Sector ID 2352 can be used, for example, to determine the sector type. Uplink channel information 2354 includes information identifying channel segments that have been allocated by scheduler 2326 for WT1 2400 to use, e.g., uplink traffic channel segments for data, dedicated uplink control channels for requests, power control, timing control, etc. Each uplink channel assigned to WT1 2400 includes one or more logical tones, each logical tone following an uplink hopping sequence. Downlink channel information 2356 includes information identifying channel segments that have been allocated by scheduler 2326 to carry data and/or information to WT1 2400, e.g., downlink traffic channel segments for user data. Each downlink channel assigned to WT1 2400 includes one or more logical tones, each following a downlink hopping sequence. Mode information 2358 includes information identifying the state of operation of WT1 2400, e.g. sleep, hold, on.

Communications routines 2322 control the base station 2300 to perform various communications operations and implement various communications protocols. Base station control routines 2324 are used to control the base station 2300 to perform basic base station functional tasks, e.g., signal generation and reception, scheduling, and to implement the steps of the method of some aspects including transmitting signals to wireless terminals using the tone subset allocation sequences during the strip-symbol periods.

Signaling routine 2328 controls the operation of receiver 2302 with its decoder 2312 and transmitter 2304 with its encoder 2314. The signaling routine 2328 is responsible controlling the generation of transmitted data 2336 and control information. Tone subset allocation routine 2330 constructs the tone subset to be used in a strip-symbol period using the method of the aspect and using data/info 2320 including downlink strip-symbol time info 2340 and sector ID 2352. The downlink tone subset allocation sequences will be different for each sector type in a cell and different for adjacent cells. The WTs 2400 receive the signals in the strip-symbol periods in accordance with the downlink tone subset allocation sequences; the base station 2300 uses the same downlink tone subset allocation sequences in order to generate the transmitted signals. Other downlink tone allocation hopping routine 2332 constructs downlink tone hopping sequences, using information including downlink tone information 2342, and downlink channel information 2356, for the symbol periods other than the strip-symbol periods. The downlink data tone hopping sequences are synchronized across the sectors of a cell. Beacon routine 2334 controls the transmission of a beacon signal, e.g., a signal of relatively high power signal concentrated on one or a few tones, which may be used for synchronization purposes, e.g., to synchronize the frame timing structure of the downlink signal and therefore the tone subset allocation sequence with respect to an ultra-slot boundary.

Exemplary Wireless Terminal

Figure 24:
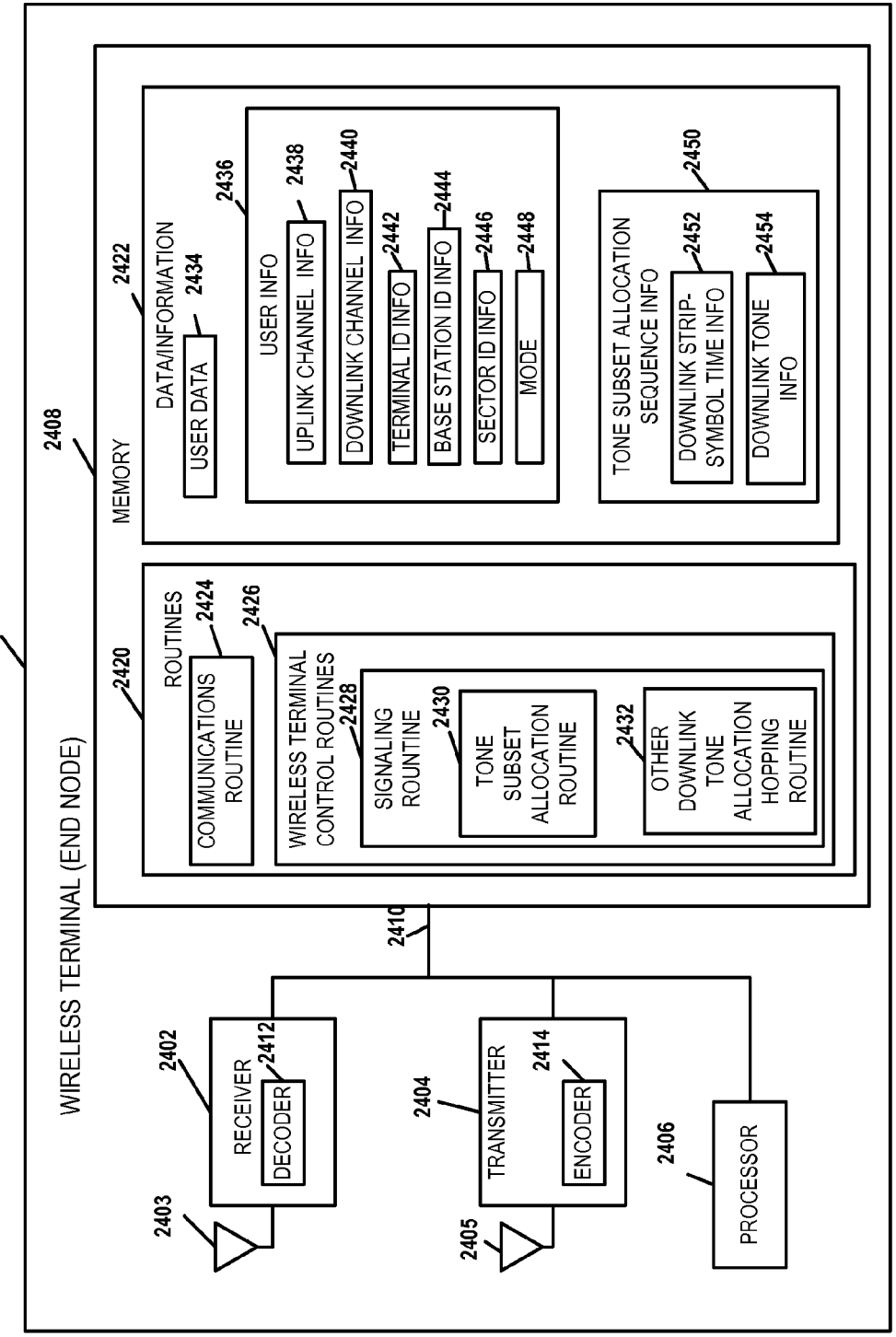
FIG. 24 is an illustration of an exemplary wireless terminal implemented in accordance with various aspects described herein.

FIG. 24 illustrates an example wireless terminal (end node) 2400 which can be used as any one of the wireless terminals (end nodes), e.g., EN(1) 2236, of the system 2200 shown in FIG. 22. Wireless terminal 2400 implements the tone subset allocation sequences. The wireless terminal 2400 includes a receiver 2402 including a decoder 2412, a transmitter 2404 including an encoder 2414, a processor 2406, and memory 2408 which are coupled together by a bus 2410 over which the various elements 2402, 2404, 2406, 2408 can interchange data and information. An antenna 2403 used for receiving signals from a base station (and/or a disparate wireless terminal) is coupled to receiver 2402. An antenna 2405 used for transmitting signals, e.g., to a base station (and/or a disparate wireless terminal) is coupled to transmitter 2404.

The processor 2406, e.g., a CPU controls the operation of the wireless terminal 2400 and implements methods by executing routines 2420 and using data/information 2422 in memory 2408.

Data/information 2422 includes user data 2434, user information 2436, and tone subset allocation sequence information 2450. User data 2434 may include data, intended for a peer node, which will be routed to encoder 2414 for encoding prior to transmission by transmitter 2404 to a base station, and data received from the base station which has been processed by the decoder 2412 in receiver 2402. User information 2436 includes uplink channel information 2438, downlink channel information 2440, terminal ID information 2442, base station ID information 2444, sector ID information 2446, and mode information 2448. Uplink channel information 2438 includes information identifying uplink channels segments that have been assigned by a base station for wireless terminal 2400 to use when transmitting to the base station. Uplink channels may include uplink traffic channels, dedicated uplink control channels, e.g., request channels, power control channels and timing control channels. Each uplink channel includes one or more logic tones, each logical tone following an uplink tone hopping sequence. The uplink hopping sequences are different between each sector type of a cell and between adjacent cells. Downlink channel information 2440 includes information identifying downlink channel segments that have been assigned by a base station to WT 2400 for use when the base station is transmitting data/information to WT 2400. Downlink channels may include downlink traffic channels and assignment channels, each downlink channel including one or more logical tone, each logical tone following a downlink hopping sequence, which is synchronized between each sector of the cell.

User info 2436 also includes terminal ID information 2442, which is a base station-assigned identification, base station ID information 2444 which identifies the specific base station that WT has established communications with, and sector ID info 2446 which identifies the specific sector of the cell where WT 2400 is presently located. Base station ID 2444 provides a cell slope value and sector ID info 2446 provides a sector index type; the cell slope value and sector index type may be used to derive tone hopping sequences. Mode information 2448 also included in user info 2436 identifies whether the WT 2400 is in sleep mode, hold mode, or on mode.

Tone subset allocation sequence information 2450 includes downlink strip-symbol time information 2452 and downlink tone information 2454. Downlink strip-symbol time information 2452 include the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone info 2454 includes information including a carrier frequency assigned to the base station, the number and frequency of tones, and the set of tone subsets to be allocated to the strip-symbol periods, and other cell and sector specific values such as slope, slope index and sector type.

Routines 2420 include communications routines 2424 and wireless terminal control routines 2426. Communications routines 2424 control the various communications protocols used by WT 2400. Wireless terminal control routines 2426 controls basic wireless terminal 2400 functionality including the control of the receiver 2402 and transmitter 2404. Wireless terminal control routines 2426 include the signaling routine 2428. The signaling routine 2428 includes a tone subset allocation routine 2430 for the strip-symbol periods and an other downlink tone allocation hopping routine 2432 for the rest of symbol periods, e.g., non strip-symbol periods. Tone subset allocation routine 2430 uses user data/info 2422 including downlink channel information 2440, base station ID info 2444, e.g., slope index and sector type, and downlink tone information 2454 in order to generate the downlink tone subset allocation sequences in accordance with some aspects and process received data transmitted from the base station. Other downlink tone allocation hopping routine 2430 constructs downlink tone hopping sequences, using information including downlink tone information 2454, and downlink channel information 2440, for the symbol periods other than the strip-symbol periods. Tone subset allocation routine 2430, when executed by processor 2406, is used to determine when and on which tones the wireless terminal 2400 is to receive one or more strip-symbol signals from the base station 2300. The uplink tone allocation hopping routine 2430 uses a tone subset allocation function, along with information received from the base station, to determine the tones in which it should transmit on.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

When the embodiments are implemented in program code or code segments, it should be appreciated that a code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc. Additionally, in some aspects, the steps and/or actions of a method or algorithm can reside as one or any combination or set of codes and/or instructions on a machine readable medium and/or computer readable medium, which can be incorporated into a computer program product.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Furthermore, as used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

What is claimed is:

1. A method that facilitates a hand-in of a user equipment to a femto cell, comprising:
   identifying, by a network entity, a macro node assigned for the femto cell;
   assigning, by the network entity, a unique identifier to the femto cell, wherein the unique identifier is taken from a Cartesian product of a set of primary scrambling codes and a set of offset values, and the set of offset values is related to a timing parameter including a first system frame number of the macro node; and
   transmitting an assignment of the unique identifier and the femto cell and the timing parameter to the femto cell for determining a second system frame number of the femto cell based on the first system frame number of the macro node and an offset value in the unique identifier, wherein the first and second system frame numbers are configured to synchronize with each other based on a periodic increment of the first system frame number received by the femto cell via a downlink channel to avoid time drifts, the periodic increment of the first system frame number is configured to be broadcast through a transport channel, and the transport channel is configured to be mapped to the downlink channel.

2. The method of claim 1, wherein the transmitting includes transmitting the relationship to an external entity.

3. The method of claim 1, wherein the transmitting includes transmitting the relationship to the femto cell.

4. The method of claim 1, further comprising ascertaining a primary scrambling code corresponding to the macro node.

5. The method of claim 4, wherein the ascertaining includes receiving a selection of at least one candidate primary scrambling code from the femto cell, the primary scrambling code being ascertained from the selection.

6. The method of claim 5, wherein the primary scrambling code ascertained from auxiliary macro cell information includes at least one of a path loss of a wireless channel between a pair of neighboring cells, a quality of a macro cell pilot signal, or a strength of a macro cell signal.

7. The method of claim 1, wherein the unique identifier is unique with respect to a localized area relative to the macro node associated with the femto cell.

8. An apparatus of a network entity that facilitates a hand-in of a user equipment to a femto cell, the apparatus comprising:
a processor configured to execute computer executable components stored in memory, the components including:
an identification component configured to identify a macro node assigned for the femto cell;
an assignment component configured to assign a unique identifier to the femto cell, wherein the unique identifier is taken from a Cartesian product of a set of primary scrambling codes and a set of offset values, and the set of offset values is related to a timing parameter including a first system frame number of the macro node; and
a transmitting component configured to transmit an assignment of the unique identifier and the femto cell and the timing parameter to the femto cell for determining a second system frame number of the femto cell based on the first system frame number of the macro node and an offset value in the unique identifier, wherein the first and second system frame numbers are configured to synchronize with each other based on a periodic increment of the first system frame number received by the femto cell via a downlink channel to avoid time drifts, the periodic increment of the first system frame number is configured to be broadcast through a transport channel, and the transport channel is configured to be mapped to the downlink channel.

9. The apparatus of claim 8, wherein the transmitting component is configured to transmit the relationship to an external entity.

10. The apparatus of claim 8, wherein the transmitting component is configured to transmit the relationship to the femto cell.

11. The apparatus of claim 8, further comprising a code component configured to ascertain a primary scrambling code corresponding to the macro node.

12. The apparatus of claim 11, further comprising a receiving component configured to receive a selection of at least one candidate primary scrambling code from the femto cell.

13. A non-transitory computer-readable storage medium embedded thereon a computer executable program comprising code for facilitating a hand-in of a user equipment to a femto cell, the code causing at least one computer of a network entity to:
identify a macro node assigned to the femto cell;
assign a unique identifier to the femto cell, wherein the unique identifier is taken from a Cartesian product of a set of primary scrambling codes and a set of offset values, and the set of offset values is related to a timing parameter including a first system frame number of the macro node; and
transmit an assignment of the unique identifier and the femto cell and the timing parameter to the femto cell for determining a second system frame number of the femto cell based on the first system frame number of the macro node and an offset value in the unique identifier, wherein the first and second system frame numbers are configured to synchronize with each other based on a periodic increment of the first system frame number received by the femto cell via a downlink channel to avoid time drifts, the periodic increment of the first system frame number is configured to be broadcast through a transport channel, and the transport channel is configured to be mapped to the downlink channel.

14. An apparatus of a network entity that facilitates a hand-in of a user equipment to a femto cell, comprising:
means for identifying a macro node assigned to the femto cell;
means for assigning a unique identifier to the femto cell, wherein the unique identifier is taken from a Cartesian product of a set of primary scrambling codes and a set of offset values, and the set of offset values is related to a timing parameter including a first system frame number of the macro node; and
means for transmitting an assignment of the unique identifier and the femto cell, and the timing parameter to the femto cell for determining a second system frame number of the femto cell based on the first system frame number of the macro node and an offset value in the unique identifier, wherein the first and second system frame numbers are configured to synchronize with each other based on a periodic increment of the first system frame number received by the femto cell via a downlink channel to avoid time drifts, the periodic increment of the first system frame number is configured to be broadcast through a transport channel, and the transport channel is configured to be mapped to the downlink channel.

15. A method that facilitates performing a hand-in of a wireless terminal to a femto cell, comprising:
detecting, by the wireless terminal, a target femto cell during an active call, the wireless terminal being connected to a macro node;
ascertaining a global identifier associated with the target femto cell, wherein the global identifier is determined by a network entity and is taken from a Cartesian product of a set of primary scrambling codes and a set of offset values, and the set of offset values is related to a timing parameter including a first system frame number of the target femto cell; and
reporting the global identifier and the first system frame number of the target femto cell to an external entity, wherein the first system frame number is determined based on a second system frame number of the macro node and an offset value in the global identifier, wherein the first and second system frame numbers are configured to synchronize with each other based on a periodic increment of the first system frame number received by the femto cell via a downlink channel to avoid time drifts, the periodic increment of the first system frame number is configured to be broadcast through a transport channel, and the transport channel is configured to be mapped to the downlink channel.

16. The method of claim 15, further comprising receiving a request to ascertain the global identifier, wherein the global identifier is ascertained in response to the request.

17. The method of claim 15, wherein the ascertaining is performed automatically upon a detection of the target femto cell.

18. An apparatus of a wireless terminal that facilitates performing a hand-in of the wireless terminal to a femto cell, the apparatus comprising:
a processor configured to execute computer executable components stored in memory, the components including:
a detection component configured to detect a target femto cell during an active call, the wireless terminal being connected to a macro node;
an identifier component configured to ascertain a global identifier associated with the target femto cell, wherein the global identifier is determined by a network entity and is taken from a Cartesian product of a set of primary scrambling codes and a set of offset values, and the set of offset values is related to a timing parameter including a first system frame number of the target femto cell; and
a transmitting component configured to report the global identifier and the first system frame number of the target femto cell to an external entity, wherein the first system frame number is determined based on a second system frame number of the macro node and an offset value in the global identifier, wherein the first and second system frame numbers are configured to synchronize with each other based on a periodic increment of the first system frame number received by the femto cell via a downlink channel to avoid time drifts, the periodic increment of the first system frame number is configured to be broadcast through a transport channel, and the transport channel is configured to be mapped to the downlink channel.

19. The apparatus of claim 18, further comprising a receiving component configured to receive a request to provide the global identifier, wherein the identifier component is configured to determine the global identifier in response to the request.

20. The apparatus of claim 18, wherein the identifier component is configured to automatically determine the global identifier upon a detection of the target femto cell.

21. The apparatus of claim 18, wherein the global identifier is received without an interruption of a source cell active mode traffic.

22. A non-transitory computer-readable storage medium embedded thereon a computer executable program comprising code for causing a wireless terminal to perform a hand-in to a femto cell, the code causing at least one computer of the wireless terminal to:
detect a target femto cell during an active call, the wireless terminal being connected to a macro node;
ascertain a global identifier associated with the target femto cell, wherein the global identifier is determined by a network entity and is taken from a Cartesian product of a set of primary scrambling codes and a set of offset values, and the set of offset values is related to a timing parameter including a first system frame number of the target femto cell; and
report the global identifier and the first system frame number of the target femto cell to an external entity, wherein the first system frame number is determined based on a second system frame number of the macro node and an offset value in the global identifier, wherein the first and second system frame numbers are configured to synchronize with each other based on a periodic increment of the first system frame number received by the femto cell via a downlink channel to avoid time drifts, the periodic increment of the first system frame number is configured to be broadcast through a transport channel, and the transport channel is configured to be mapped to the downlink channel.

23. The non-transitory computer-readable storage medium of claim 22, wherein the code further causes the at least one computer to:
receive a request to provide the global identifier, and determine the global identifier in response to the request.

24. An apparatus of a wireless terminal that facilitates performing a hand-in of the wireless terminal to a femto cell, comprising:
means for detecting a target femto cell during an active call, the wireless terminal being connected to a macro node;
means for ascertaining a global identifier associated with the target femto cell, wherein the global identifier is determined by a network entity and is taken from a Cartesian product of a set of primary scrambling codes and a set of offset values, and the set of offset values is related to a timing parameter including a first system frame number of the target femto cell; and
means for reporting the global identifier and the first system frame number of the target femto cell to an external entity, wherein the first system frame number is determined based on a second system frame number of the macro node and an offset value in the global identifier, wherein the first and second system frame numbers are configured to synchronize with each other based on a periodic increment of the first system frame number received by the femto cell via a downlink channel to avoid time drifts, the periodic increment of the first system frame number is configured to be broadcast through a transport channel, and the transport channel is configured to be mapped to the downlink channel.

25. The apparatus of claim 24, wherein the means for ascertaining comprises means for automatically ascertaining the global identifier upon a detection of the target femto cell.

* * * * *